United States Patent [19]

Natarajan

[11] Patent Number: 5,517,602
[45] Date of Patent: May 14, 1996

[54] METHOD AND APPARATUS FOR GENERATING A TOPOLOGICALLY CONSISTENT VISUAL REPRESENTATION OF A THREE DIMENSIONAL SURFACE

[75] Inventor: Balas K. Natarajan, Los Gatos, Calif.

[73] Assignee: Hewlett-Packard Company, Palo Alto, Calif.

[21] Appl. No.: 984,770

[22] Filed: Dec. 3, 1992

[51] Int. Cl.$^6$ ................................................ G06F 17/50
[52] U.S. Cl. .................................................. 395/119
[58] Field of Search ................................. 395/119, 124

[56] References Cited

U.S. PATENT DOCUMENTS

| | | | |
|---|---|---|---|
| 4,710,876 | 12/1987 | Cline et al. | 395/124 |
| 4,719,585 | 1/1988 | Cline et al. | 395/124 |
| 4,729,098 | 3/1988 | Cline et al. | 395/124 |
| 4,791,567 | 12/1988 | Cline et al. | 395/124 |
| 4,914,589 | 4/1990 | Crawford | 395/124 |
| 5,079,699 | 1/1992 | Tuy et al. | 395/124 |
| 5,166,876 | 11/1992 | Cline et al. | 395/124 |
| 5,201,035 | 4/1993 | Stytz et al. | 395/119 |
| 5,361,385 | 11/1994 | Bakalash | 395/124 |

FOREIGN PATENT DOCUMENTS

| | | |
|---|---|---|
| 0204225A1 | 12/1986 | European Pat. Off. . |
| 0564318A2 | 12/1986 | France . |

OTHER PUBLICATIONS

En–Hua Wu et al., "A solution of Disambiguation in Isosurface Generation", Proceedings, Third Eurographics Workshop on Visualization in Scientific Computing, Apr. 27, 1992, Italy, pp. 255–270.

Wilhelms, J. et al., "Topological Considerations in Isosurface Generation", 1990 Workshop on Volume Visualization, San Diego, California, Dec. 10–11, 1990, vol. 24, No. 5, ISSN 0097–8930, Computer Graphics, Nov., 1990, pp. 79–86.

Turk, G., "Retiling Polygonal Surfaces", Computer Graphics, vol. 26, No. 2, Jul. 2, 1992, pp. 55–64.

Ning, P. et al., "Adaptive Isosurface Generation in a Distortion–Rate Framework", Proceedings of the SPIE Extracting Meaning from Complex Data Processing, Display, Interaction II, vol. 1459, Feb. 26, 1991; pp. 11–21.

Nielsen, G. M., and Hamann, G., (1991), "The Asymptotic Decider; resolving the ambiguity in marching cubes." Proceedings of Visualization '91.

Artzy, E. Frieder, G., and Herman, G. (1980). The Theory, design implementation and evaluation of a three dimensional surface Detection Algorithm, Computer Graphics, vol. 14, No. 3, pp. 2–9.

Christiansen, H. N. and Sederberg, T. W. (1978). Conversion of complex contour lines into polygonal element mosaics, Computer Graphics, vol. 12 No. 3, pp. 187–192.

Cline, H. E., Lorenson, W. E., Ludke, S. Crawford, C. R., and Teeter, B. C. (1988) Two Algorithms for the three-dimensional reconstruction of tomograms, Medical Physics, Bol. 15, No. 3, pp. 64–71.

Drebin, R. A., Carpenter, L., and Hanrahan, P. (1988). Volume rendering, Computer Graphics, vol. 22, No. 4, pp. 125–134.

Durst, M. J. (1988). letters: Additional reference to "marching cubes." Computer Graphics, vol. 22, No. 2.

Fuchs, H., Kedem, Z. M., and Uselton, S. P. (1977). Optimal surface reconstruction from planar conturs, Communications of the ACM, vol. 10, pp. 693–702.

(List continued on next page.)

*Primary Examiner*—Heather R. Herndon
*Assistant Examiner*—N. kenneth Burreston

[57] ABSTRACT

A method and apparatus that provide topologically consistent visual displays of an internal characteristic of a physical object. A measured signal pattern is generated, which describes how the characteristic varies spatially within the physical object. The signal pattern and a threshold value are used to generate a piecewise polygonal approximation, descriptive of the internal characteristic, that is topologically consistent with the internal characteristic. The polygonal approximation is used to generate and display an image representative of the internal characteristic.

13 Claims, 18 Drawing Sheets

OTHER PUBLICATIONS

Levoy, M. (1988). Display of surfaces from volume dta, IEEE Computer Graphic and Applications, May, vol. 8, No. 5, pp. 135–143.

Wilhelms, J., and Van Gelder, A. (1990a.) Topological Considerations in Isosurface Generation Extended Abstract. Computer Graphics, vol. 24, No. 5, pp. 79–86.

Wilhems, J., and Van Gelder, A. (1990b.) Octress for faster isosurface generation. Computer Graphics, vol. 24, No. 5. pp. 57–62.

Wyvill, G., McPheeters, C., and Wyvill, B. (1986.) Data structures for soft objects, The Visual Computer, vol. 2, No. 4, pp. 227–234.

Wu and Hessellink (1988), Computer display of reconstructed 3–D scalar data, Applied Optics, vol. 27, No. 2, pp. 395–404.

METHOD AND APPARATUS FOR GENERATING A TOPOLOGICALLY CONSISTENT VISUAL REPRESENTATION OF A THREE DIMENSIONAL SURFACE

BACKGROUND

The present invention is generally directed to an apparatus and method that generates, analyzes and graphically displays information descriptive of a physical object, and more particularly to a method and apparatus that provides a topologically consistent visual representation of a three dimensional surface.

An automated measurement system can generate a vast amount of information respecting a characteristic of a physical object under examination. Such information becomes much more useful if it is simplified and presented in an understandable way. Given a measured signal pattern that describes how a characteristic varies spatially within a bounded region, the information provided by the signal pattern can be simplified by selecting a value of the characteristic and then generating a set of all points within the bounded region where the value of the characteristic is equal to the selected value. These points are said to define a three dimensional surface called an "isosurface". This is because the prefix "iso" generally means "same" or "equal" and, at every point on the isosurface, the value of the characteristic equals the selected value. Generating a visual representation of the isosurface on a graphical display device has been found to be a useful way of presenting the information in a simplified, understandable form.

For example, computer aided tomography scanners provide a vast amount of X-Ray attenuation data when a human brain is analyzed. This data becomes much more useful if it is simplified and presented in an understandable way. Given X-Ray attenuation data points that describes how X-Ray absorption by brain tissue spatially varies within the brain, the X-Ray attenuation data can be simplified by selecting a single attenuation value corresponding to a particular tissue absorption level. By selecting an attenuation value that corresponds to X-Ray absorption by a brain tumor's outer layer and generating a set of all points within a region of the brain where attenuation is equal to the selected value, the X-Ray attenuation data can reveal an isosurface corresponding to a brain tumor hidden within the brain. By generating a visual representation of the tumor isosurface on a graphical display, a doctor can see the shape and location of the tumor. The display aids the doctor in determining whether the tumor can be safely removed.

As another example, a measurement system can generate a signal pattern describing various fluid velocities within a fluid flow. The fluid velocity signal pattern can be simplified by selecting a single fluid velocity value that is related to potential generation of undesired turbulent flow. By generating a set of all points within a region of the fluid flow where the fluid velocity is equal to the selected value, the fluid velocity signal pattern can be used to reveal an isosurface corresponding to a fluid velocity layer within the fluid flow. By generating a visual representation of the fluid velocity isosurface on a graphical display, a design engineer can see the shape and location of the fluid velocity layer that leads to undesired turbulent flow. The display aids the design engineer in determining how to alter the fluid flow so as to reduce turbulent flow.

As yet another example, a measurement system can generate a signal pattern describing various temperatures within a nuclear reactor core. The temperature signal pattern can be simplified by selecting a single temperature value that corresponds to a suspected fault condition. By generating a set of all points within a region of the core where the temperature is equal to the selected value, the temperature signal pattern can be used to reveal an isosurface corresponding to a temperature layer within the core. By generating a visual representation of the temperature isosurface on a graphical display, a nuclear engineer can see the shape and location of the temperature layer indicating the fault condition. The display aids the nuclear engineer in determining how to safely shut down the reactor core.

Though it has long been known that isosurfaces are a helpful way of analyzing and displaying information, certain difficulties are associated with their generation and display. In the example of the temperature measurement system discussed above, temperature is measured at spaced apart grid locations that usually do not precisely coincide with the location of the temperature layer of interest. Accordingly, complete knowledge of the isosurface corresponding to the temperature layer is unavailable. In general the isosurface corresponding to the temperature layer lies spatially between measured locations. A technique known as "interpolation" is used to estimate the spatial coordinates of points approximately lying on the isosurface between these measured locations. Thus an "interpolant isosurface" is a three dimensional surface defined by a set of all interpolated points within the bounded region where the value of the characteristic is equal to the selected value. This concept is further illustrated in the following example.

As shown in FIG. 1 twenty seven temperature measurements are taken at spaced apart grid locations within the volume of a reactor core. It is assumed that a 100 degree temperature layer is of particular interest, so a threshold value of 100 degrees is chosen. For the purposes of illustration, as shown in FIG. 1 the measured locations having temperatures greater than 100 degrees are represented by black balls, while measured locations having temperatures less than 100 degrees are represented by white balls. As shown, an interpolant isosurface 1 lies spatially between measured temperature locations. This is so because in this example, none of the measured locations provided a temperature measurement of exactly 100 degrees.

It should be noted from FIG. 1 that the interpolant isosurface partitions the three dimensional signal pattern into pattern groupings 2 and 3. More particularly in this example, the interpolant isosurface partitions the three dimensional signal pattern into just two pattern groupings. Pairs of adjacent measurement points that are part of the same pattern grouping are shown in FIG. 1 as being connected by heavily drawn lines. Pairs of adjacent measurement points that are not part of the same pattern grouping are shown in FIG. 1 as being connected by thinly drawn lines. Such partitioning of the three dimensional signal pattern by the interpolant isosurface is of great importance in defining the topology of the isosurface and will be discussed in greater detail later in the present application.

It has previously been known that one method of generating a visual representation of an interpolant isosurface is to interpolate a large number of point elements and then display the point elements on a graphics display device. This method is substantially similar to the method taught in U.S. Pat. No. 4,719,585 entitled "Dividing Cubes System and Method for the Display of Surface Structures Contained Within the Interior Region of a Solid Body" by Cline et al. Because Cline ('585) provides helpful background information on the difficulties of generating and displaying interpolant isosurfaces, Cline ('585) is incorporated here by reference. The dividing cubes method interpolates a number of point elements corresponding to a number of pixel display elements on the graphical display device. Thus the number of point elements matches the resolution of the graphical display device. Currently, high resolution display devices offer resolutions of 1280 by 1024 pixels. As might be expected, interpolating such a large number of point elements creates a tremendous computational burden. A less complex display requiring fewer interpolated points is desirable to ease this computational burden.

It is computationally less burdensome and more efficient to use a method known as a "piecewise polygonal approximation" to generate a visual representation of the interpolant isosurface. Such an approximation to the interpolant isosurface is created by computing coordinates of a set of points, called a set of polygon vertex points, which lie on the interpolant isosurface between pairs of adjacent grid locations where the characteristic of the physical object is measured.

The set of polygon vertex points are then interconnected to from a network of polygons, the polygon vertex points being vertices of the network of polygons. This method is known as a piecewise polygonal approximation because the network of polygons approximate the interpolant isosurface. The network of polygons is then used to generate the visual representation of the interpolant isosurface on the graphical display device.

Methods that generate the piecewise polygonal approximation to the interpolant isosurface are described in two other patents issued to Cline et al. One is U.S. Pat. No. 4,729,098 entitled "System and Method Employing Nonlinear Interpolation for the Display of Surface Structures Contained Within the Interior Region of a Solid Body". The other is U.S. Pat. No. 4,710,876 entitled "System and Method for the Display of Surface Structures Contained Within the Interior Region of a Solid Body". Because Cline ('098) and Cline ('876) both provide helpful background information on the difficulties of generating visual representations of interpolant isosurfaces, both patents are incorporated here by reference. The polygon vertex points discussed previously herein are referred to more generally at some parts of both Cline ('098) and Cline ('876) simply as vertex points, though such vertex points are still discussed in these patents in the context of polygonal or triangular surfaces.

The display generated by piecewise polygonal approximation is of low complexity because a small number of interpolated points are used in defining the network of polygons. Such low complexity allows efficient use of computational resources. Despite these positive attributes, previously known methods of generating piecewise polygonal approximations have serious shortcomings.

The problem of "topological consistency" arises in constructing piecewise polygonal approximations because certain groups of polygon vertex points present an ambiguity as to how they are to be interconnected to form the network of polygons. The ambiguity may be resolved in numerous "ad hoc" ways since there are numerous possible ways of interconnecting the polygon vertex points. However for a given signal pattern, only one way of linking such groups of polygon vertex points will produce a piecewise polygonal approximation that is topologically consistent with an interpolant isosurface determined by a particular threshold value. The term "topologically consistent" is defined in the following context: to say that the piecewise polygonal approximation is topologically consistent with the interpolant isosurface means that the piecewise polygonal approximation partitions the three dimensional signal pattern into the same pattern groupings as does the interpolant isosurface.

Cline ('098) and Cline ('876) employ ad hoc methods, yielding piecewise polygonal approximations that are not always topologically consistent with the interpolant isosurface. This creates undesirable results because the display of a topologically inconsistent piecewise polygonal approximation includes anomalous surface features that are not present in the interpolant isosurface. As might be expected, such anomalous surface features tend to attract the interest and mental focus of a person viewing the graphical display. In this way, the anomalous surface features confuse and mislead the person viewing the display. Even more confusion is created because such anomalous surface features do not appear at all levels of display refinement. The anomalous surface features can appear when a coarse piecewise polygonal approximation is displayed on the graphical display device, but then they can disappear when a refined piecewise polygonal approximation is displayed on the graphical display device. This type of problem is highlighted in the following example.

For the sake of this example it will be said that a surgical patient's brain is being examined by the CAT scan machine discussed earlier. The interpolant isosurface of interest corresponds to the outer layer of a brain tumor, and an ad hoc method is used to generate coarse and refined piecewise polygonal approximations of the interpolant isosurface of interest. FIG. 2A shows a coarse graphical display 100 generated by displaying the coarse polygonal approximation of the interpolant isosurface on a graphics display device. The coarse graphical display is viewed by a doctor who is striving to determine whether the shape and location of the brain tumor will allow safe surgical removal. The doctor notices what appears to be an interesting surface feature as depicted by a particular portion 102 of the coarse display 100. The doctor commands the system to "zoom in" on this feature. In response to the doctor's command, the system generates additional polygon vertex points and interconnects the additional polygon vertex points, thereby producing the refined polygonal approximation and an expanded display 103 of the feature under study, as shown in FIG. 2B. Whereas the portion 102 of the coarse display 100 suggested a protruding-peninsular shaped extension feature 104 of the tumor, the expanded display 103 shows a smaller tumor having a rounded end 105 and a small, disconnected island 106 some distance apart from the rest of the tumor. This is confusing to the doctor, because the interesting surface feature has transformed in an unexpected way. As this example illustrates, ad hoc methods can produce coarse polygonal approximations and refined polygonal approximations that have different topologies. If the coarse polygonal approximation and the refined polygonal approximation were each topologically consistent with the interpolant isosurface, then the confusion discussed previously would be avoided.

The above discussions have generally outlined the difficulties of generating visual representations of an interpolant isosurface. As discussed previously, the method disclosed in Cline ('585) does not produce a visual representation having low complexity. Methods disclosed in Cline ('098) and ('876) do not produce visual representations that are always topologically consistent with the interpolant isosurface. In summary, what is needed is a method for displaying an interpolant isosurface by generating a visual representation that is of low complexity, and topologically consistent with the isosurface.

SUMMARY OF THE INVENTION

The present invention provides a method and apparatus that provide topologically consistent visual displays of an internal characteristic of a physical object at various levels of detail with great computational efficiency. Efficiency is achieved by means of a novel way of generating a low complexity display. Because the display depicts the characteristic consistently across different views, the display does not provide confusing information such as surface features that seem to disappear when a user changes the scale or selects a different view.

Briefly and in general terms, a method according to the invention includes generating a three dimensional signal pattern that represents a physical property associated with a three dimensional body at spaced apart locations within the body. The method further includes generating a threshold value of the physical property wherein the threshold value and the three dimensional signal pattern define a three dimensional isosurface. The threshold value is typically provided by a user and the signal pattern is obtained from some source, for example an automated measurement system such as a computed tomography scanner. Given that the isosurface partitions the signal pattern into pattern groupings, the method generates a piecewise polygonal approximation that partitions the signal pattern into the same pattern groupings as does the isosurface, thereby maintaining topological consistency between the isosurface and the polygonal approximation of the isosurface. The polygonal approximation is used to generate an image representative of the three dimensional isosurface.

In a preferred embodiment, generating the piecewise polygonal approximation includes converting the three dimensional signal pattern into a set of data vectors. Each data vector has a physical property component and a location component corresponding to a respective one of the spaced apart grid locations. Sorting the data vectors creates a first group of data vectors having a physical property component less than the threshold value, and a second group of data vectors each having a characteristic component greater than the threshold value. Generating coordinates of a set of polygon vertex points approximately lying on the three dimensional isosurface is accomplished by interpolating between respective members of the first and second group of data vectors. Selectively linking members of the set of polygon vertex points in response to one or more saddle value comparisons generates a network of polygons. The polygon vertex points are selectively linked in such a way that the resulting network of polygons realizes the piecewise polygonal approximation of the isosurface that is topologically consistent with the isosurface. Other aspects and advantages of the present invention will become apparent from the following detailed description, taken in conjunction with the accompanying drawings, illustrating by way of example the principles of the invention.

DESCRIPTION OF PREFERRED EMBODIMENT

As shown in the exemplary drawings, the invention is embodied in a method and apparatus for generating topologically consistent visual displays depicting a surface at various levels of detail with great computational efficiency. Various methods of generating displays that depict three dimensional surfaces are known, but these methods have not been able to provide topologically consistent displays in a computational efficient manner.

The invention is particularly directed to a new method and apparatus for generating a network of polygons that form a topologically consistent piecewise polygonal approximation of the surface being depicted. While there are numerous ad hoc ways of linking a set of polygon vertex points to create polygons, the method of the present invention provides a way of generating a network of polygons that is topologically consistent with the surface. As will be explained in detail herein, the method and apparatus of the present invention employ unique "saddle values" in generating the polygonal approximation of the surface being depicted.

As indicated previously, the invention includes generating a three dimensional signal pattern that represents a physical property associated with a three dimensional body at spaced apart grid locations within a body. In a preferred embodiment, regular uniform sampling of the three dimensional body yields a three dimensional grid that divides the body being examined into a plurality of cubic cells within the body. In alternative embodiments, regular non-uniform sampling of the three dimensional body yields a three dimensional grid that divides the body being examined into a plurality of hexahedral cells, corresponding to a continuous deformation of the cubic cells. An example of such deformed cells is rectangular parallelepiped cells. Although it should be understood that the present invention is not limited to regular uniform sampling and the resulting cubic cells, the illustrations herein are directed to cubic cells for the sake of clarity.

Figure 3A:
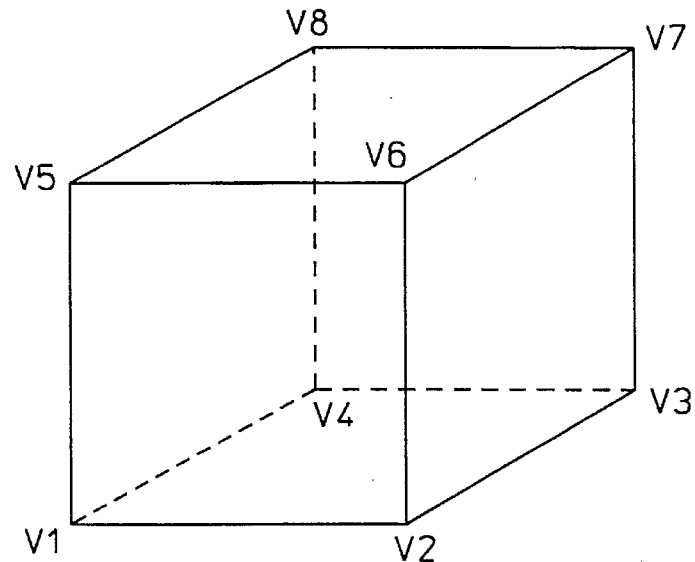
FIG. 3A is a perspective view of a cubic cell that illustrates a standard scheme for labeling cube vertices of the cell.
Figure 3B:
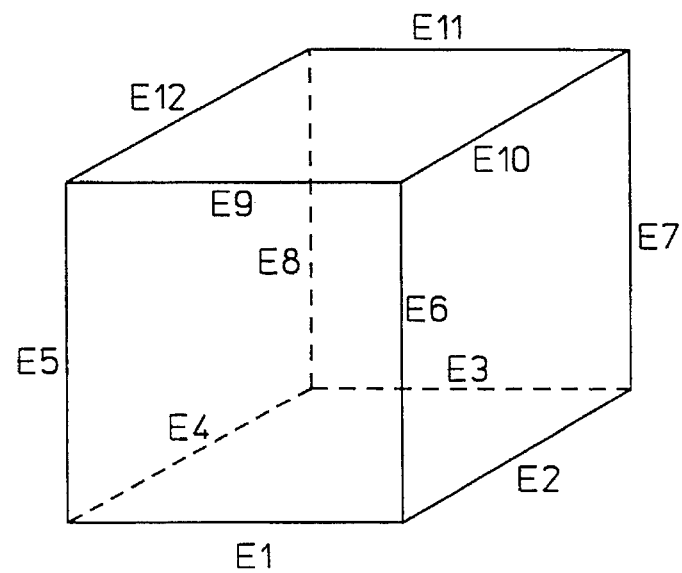
FIG. 3B is a perspective view of a cubic cell that illustrates a standard scheme for labeling cube edges of the cell.

An illustration of the method of the present invention applied to a single cubic cell can be easily generalized and applied to the plurality of cubic cells within the body. For the purposes of illustrating the present invention, an example of a cubic cell is introduced as shown in FIG. 3A and 3B. In order to understand the contents of these figures, one must first appreciate conventions employed for labeling edges and vertices of the cube. FIG. 3A, which illustrates the labelling convention applied to eight cube vertices V1 through V8. Likewise FIG. 3B illustrates the labeling of the 12 cubical edges E1 through E12. In FIG. 3A, the set of eight cube vertices illustrated are describable as being spatially co-adjacent. Since scaling in any of three distinct directions is possible, the discussions herein of the cubic cell are analogously applied to a rectangular parallelepiped. It is pointed out that the illustration in FIGS. 3A and 3B have been drawn with cube edges E3, E4, and E8 being shown as dotted lines to reflect their presence at the rear of the structure, that is, they are illustrated as hidden lines. This is also true of FIGS. 6, 8B, 9B, 10B, 11B, 12B, 14B, and 15B discussed in greater detail later herein. It is noted that other cube vertex and cube edge labelling arrangements could just as easily have been employed without substantially changing the principles of the present invention. It is nonetheless important, however to employ consistent cube edge and cube vertex labeling schemes. For the sake of clarity, the cube vertex labelling conventions and the cube edge labelling conventions used herein are the same as used in U.S. Pat. No. 4,710,876 entitled "System and Method for the Display of Surface Structures Contained Within the Interior Region of a Solid Body" and issued to Cline et al.

Figure 4:
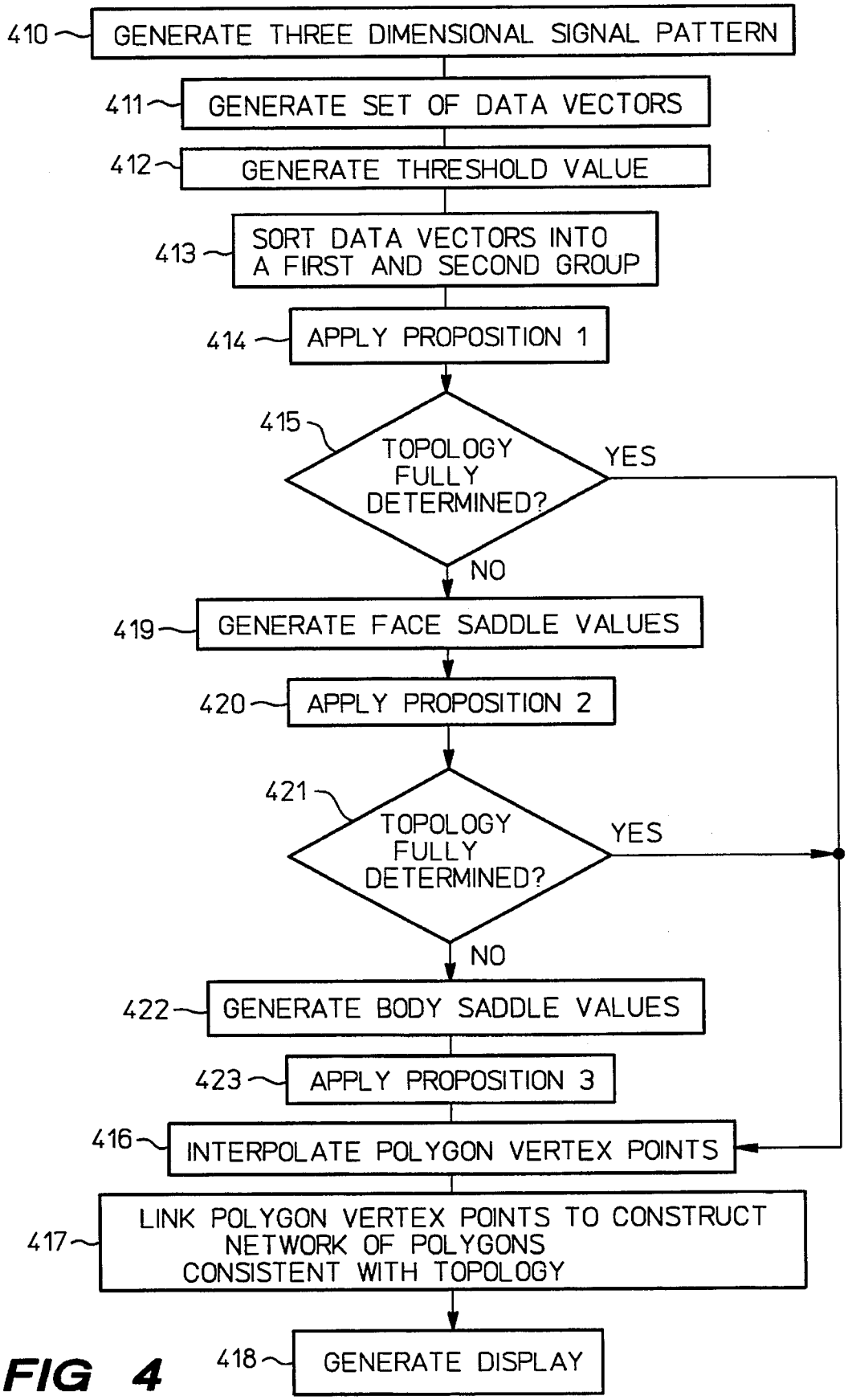
FIG. 4 is a flow chart illustrating the method of the present invention.

FIG. 4 is a flow chart of the method of the present invention that will be illustrated by application to the cubic cell shown in FIGS. 3A and 3B. The cubic cell would be created by first generating a three dimensional signal pattern that describes the values of a physical property associated with a three dimensional body at spaced apart grid locations within the body, as signified by block 410 of the flow chart of FIG. 4. As will be discussed in greater detail later herein, an example of the signal pattern is X-Ray attenuation signals generated by operation of a CAT scan machine. As signified by block 411 of the flow chart of FIG. 4, the three dimensional signal pattern is converted to generate a set of data vectors, each data vector having a physical property component and a location component corresponding to a respective one of the spaced apart grid locations. Consistent with the simplified illustration of FIGS. 3A and 3B, the flow chart of FIG. 4 in discussed herein, illustrating the operation of the present invention on a grouping of eight data vectors, each data vector corresponding to a respective one vertex of the cubic cell shown in FIGS. 3A and 3B.

As signified by block 412 of the flow chart of FIG. 4, a threshold value of the physical property is generated. As will be discussed in greater detail later herein, an example of generating a threshold value is when an operator of a CAT scan display types the threshold value at a keyboard, in order to display a particular tissue layer corresponding to the threshold value.

Figure 1:
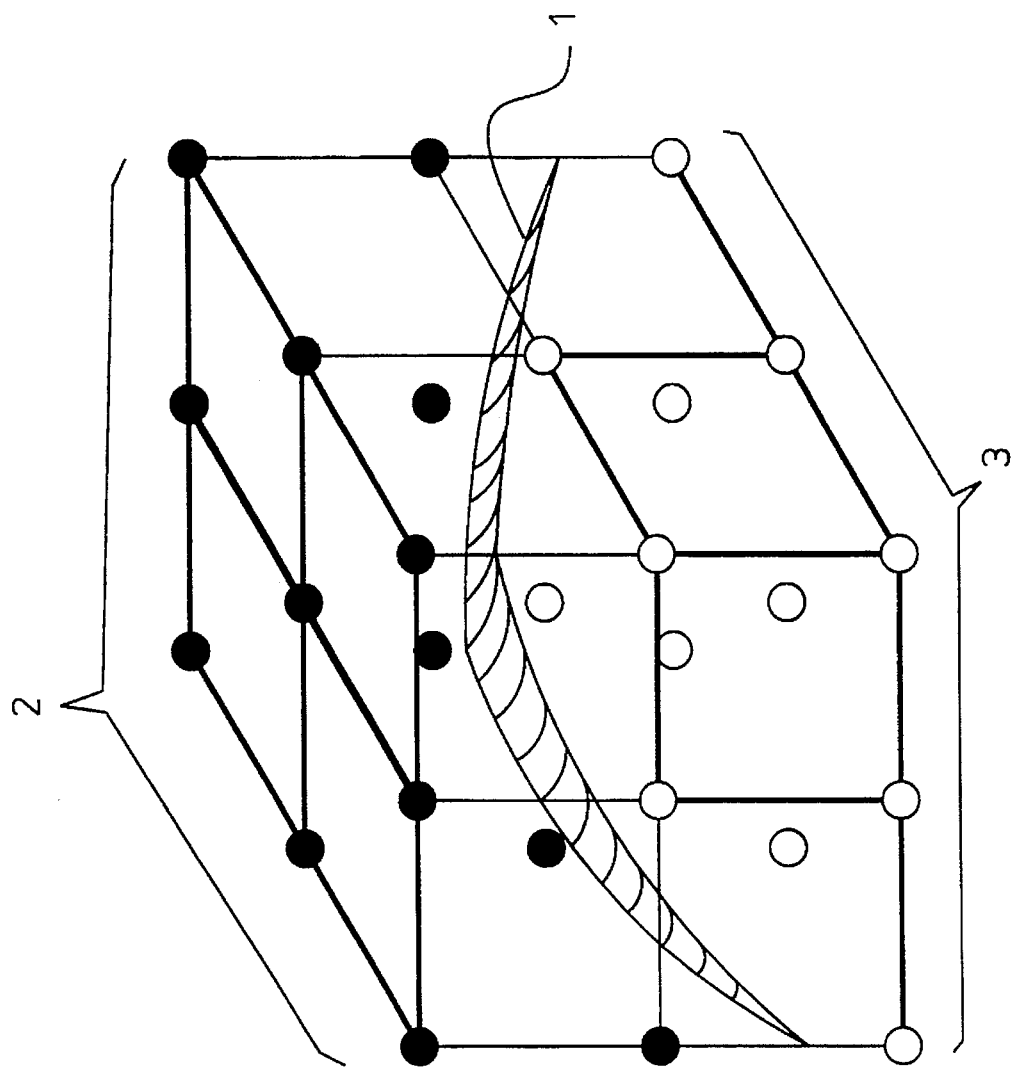
FIG. 1 shows a perspective view of an interpolant isosurface partitioning a three dimensional signal pattern into two pattern groupings.

The threshold value and the three dimensional signal pattern define an interpolant isosurface, wherein the isosurface would partition the three dimensional signal pattern into pattern groupings. An example illustrating an interpolant isosurface intersecting a plurality of cubic cells and partitioning the signal pattern into two pattern groupings was discussed previously and shown in FIG. 1. The method of the present invention constructs a network of polygons so that the network of polygons partitions the signal pattern into the same pattern groupings as would the isosurface. In this way the network of polygons is topologically consistent with the isosurface.

Eight data vectors correspond to the eight vertices of the cubic cell. As signified by block 413 of the flow chart of FIG. 4, the data vectors are sorted to create a first and second group of data vectors; the first group including data vectors each having a physical property component less than the threshold value, and the second group including data vectors each having a physical property component greater than the threshold value. For the sake of clarity, in the preferred embodiment and in all further illustrative discussions herein, data vectors that have a physical property component equal to the threshold value are treated as if they had a physical property component greater than the threshold value. Accordingly, in the illustrations herein, data vectors that have a physical property component equal to the threshold value are included in the second group. It should be briefly noted that in alternative embodiments, data vectors having a physical property component equal to the threshold value are included in the first group instead of being included in the second group. Therefore it should be understood that the present invention is not limited to grouping the data vectors having a physical property component equal to the threshold value together with the data vectors having a physical property component that is greater than the threshold value.

The sorting of the data vectors into the first and second group is illustrated herein using the cubic cell. A respective black ball is used to represent each cube vertex associated with a respective physical property value that is greater than the threshold value, and a respective white is used to represent each cube vertex associated with a respective physical property value that is less than the threshold value. Since there are eight cube vertices and each cube vertex may be represented with either white or black balls, there are 256 possible configurations of the cube vertices. Owing to rotational symmetries, and the complementary symmetry of interchanging the white and the black colon, the 256 configurations can be reduced to 15 base cases. The 15 cases are shown in FIGS. 5A–5O as case 1 (501), case 2 (502), case 3 (503), case 4 (504), case 5 (505), case 6 (506), case 7 (507), case 8 (508), case 9 (509), case 10 (510), case 11 (511), case 12 (512), case 13 (513), case 14 (514) and case 15 (515). For purposes of illustration, cube vertices represented by white balls are said to be colored white, and cube vertices represented by black balls are said to be colored black.

In partitioning the three dimensional signal pattern into pattern groupings, the isosurface would analogously partition cube vertices of the cell. For purposes of illustration, cube vertices of the same color that have not been partitioned from one another are said to have connectivity. Extending the cube analogy, if two cube vertices can be connected by a path in the cubic cell or on its boundary, such that the path does not pierce the isosurface, then the two cube vertices of the cell are said to be connected. If the path consists solely of cube edges of the cell, then the two cube vertices are edge connected. If the path lies entirely on a particular face of the cell, then the two cube vertices are connected on that face. If the path lies entirely on the boundary of the cell, then the two cube vertices are boundary connected. Based on this analysis, the following proposition is asserted:

Proposition 1: Two cube vertices are edge-connected if and only if they are connected by a path consisting of edges of the cell and cube vertices all of the same color.

Proposition 1 has been applied to the 15 base cases shown in FIGS. 5A–5O. As shown in FIGS. 5A–5O, for cube vertices that are connected by a path along a cube edge, the cube edge is heavily drawn. Conversely, for cube vertices that are not connected by a path along a cube edge, the cube edge is thinly drawn.

Of course the visual depiction of black and white vertices and heavily drawn connecting lines exists only for the purposes of illustration. The present invention actually operates on data vectors corresponding to the cube vertices. Accordingly, a pair of data vectors have connectivity if the pair of data vectors is associated with a pair of cube vertices of the same color that have not been partitioned from one another. As signified by block 414 of the flow chart of FIG. 4, Proposition 1 is analogously applied to the eight data vectors corresponding to the eight cube vertices, thereby determining the edge connectivity of the data vectors. Two data vectors are edge-connected if and only if they are connected by a path consisting of edges of the cell, wherein all the data vectors coincident with the path have physical property components that are either all greater than the threshold value or are all less than the threshold value.

It should be noted that for each of cases 1 through 8 shown in FIGS. 5A–5H, all cube vertices of the same color are edge connected. Since an edge connected path does not pierce the isosurface, there is only one respective way that the isosurface would partition the cubic cell for each of cases 1 through 8. Accordingly, Proposition 1 is sufficient to establish how the isosurface would partition the cell for cases 1 through 8 shown in FIGS. 5A–5H. In this sense, the topology of the isosurface is fully determined by Proposition 1 for these eight cases. Following the flow chart of FIG. 4, if the topology of the isosurface is fully determined by Proposition 1 (block 421), then interpolation is used to generate a set of polygon vertex points (block 416). The polygon vertex points are then selectively linked to construct a network of polygons (block 417) consistent with the topology determined.

Each polygon vertex point approximately lies where the isosurface intersects a respective edge of the cubic cell. Coordinates of each member of the set of polygon vertex points are interpolated using a respective data vector belonging the first group and a respective data vector belonging to the second group, wherein the data vectors used correspond to cube vertices located on the same edge of the cubic cell. The method of interpolation used in a preferred embodiment of the present invention is discussed in greater detail later in the Appendix A of the present application. Once coordinates of the set of polygon vertex points are generated (block 416), the polygon vertex points are linked to construct a network of polygons that is topologically consistent with the isosurface (block 417). Once the polygon vertex points are linked to construct the network of polygons (block 417), the network of polygons is used to generate a display depicting the isosurface (block 418).

Figure 5:
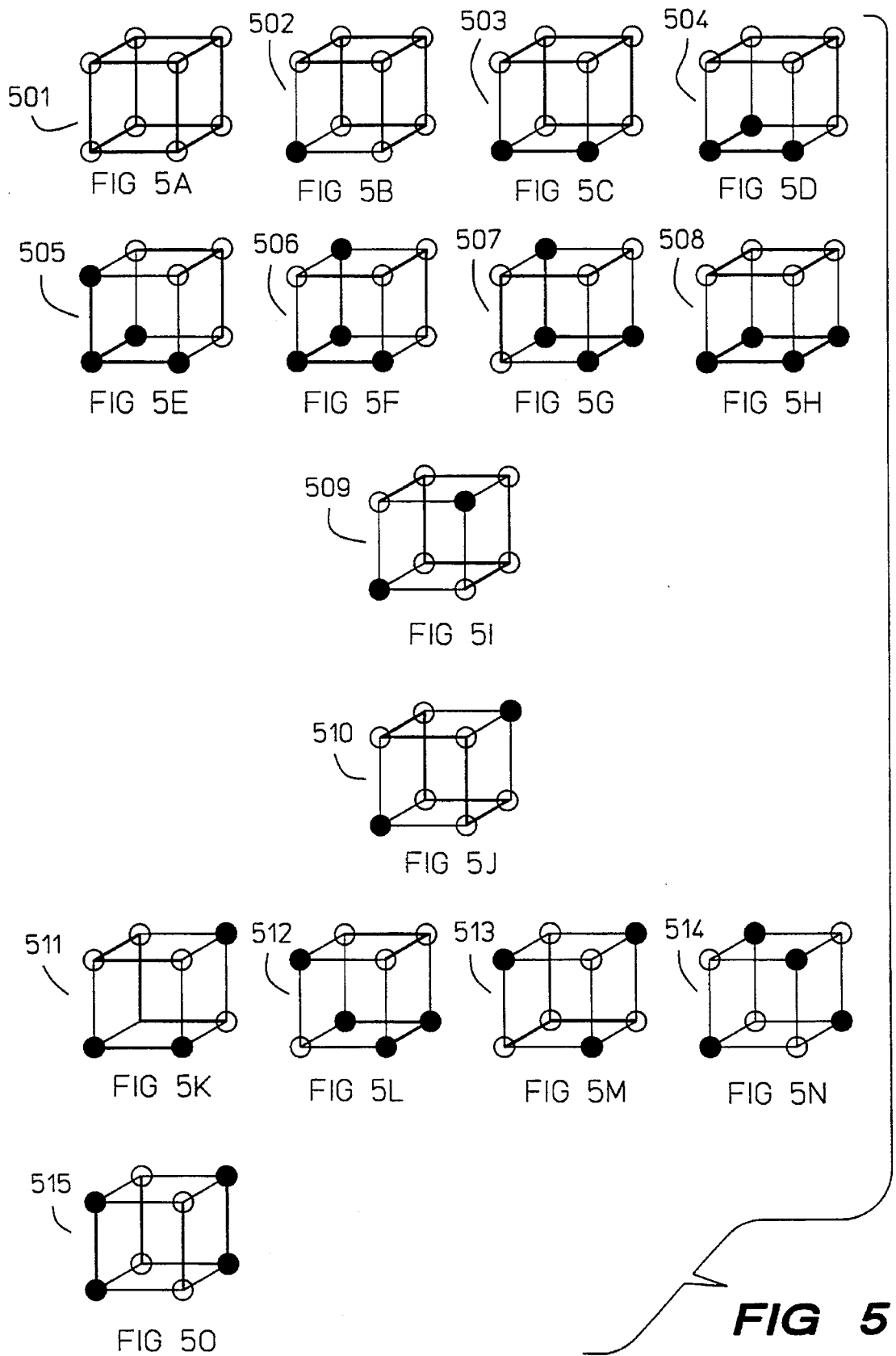
FIGS. 5A–5O respectively show base cases 1 through 15 for the cubic cell.
Figure 6A:
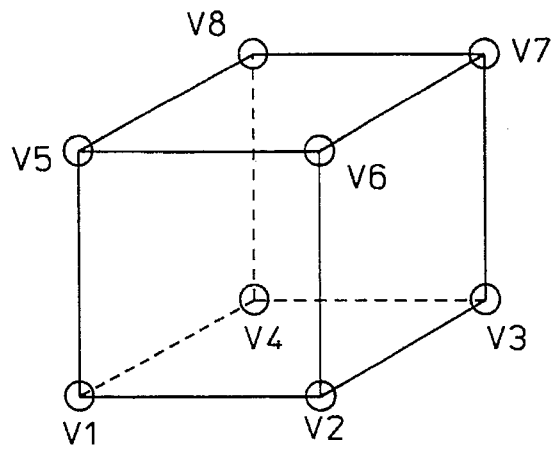
FIGS. 6A–6H show how a respective network of polygons partitions the cubic cell for each of base cases 1 through 8 respectively shown in FIGS. 5A–5H.
Figure 6B:
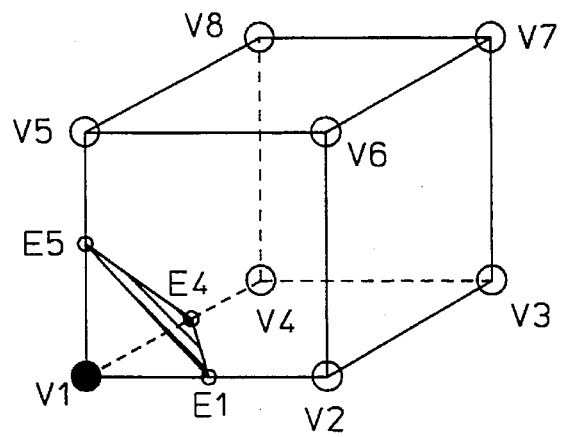
Figure 6C:
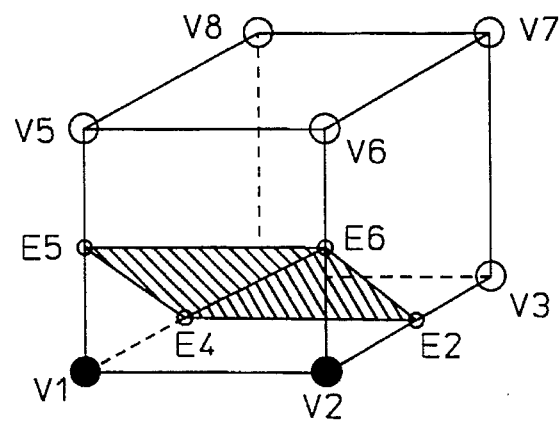
Figure 6D:
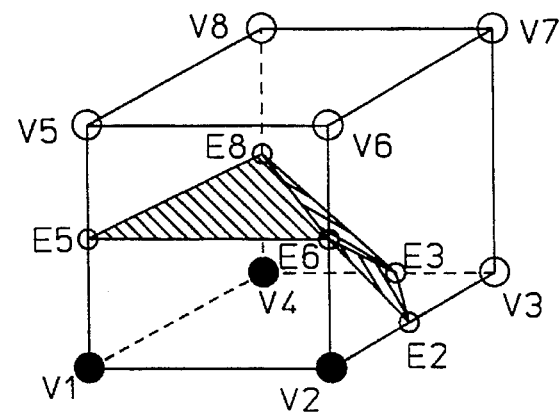
Figure 6E:
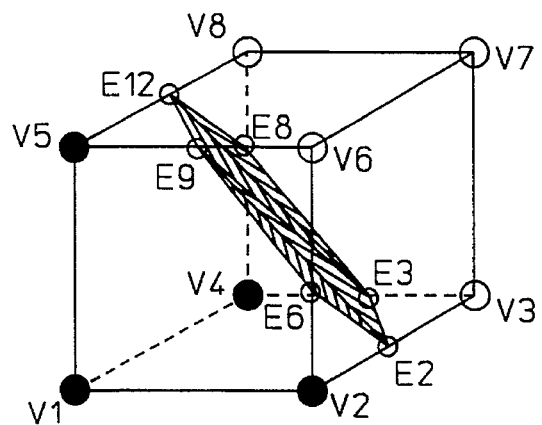
Figure 6F:
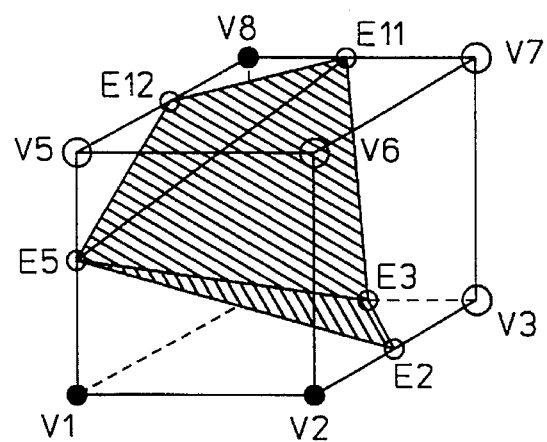
Figure 6G:
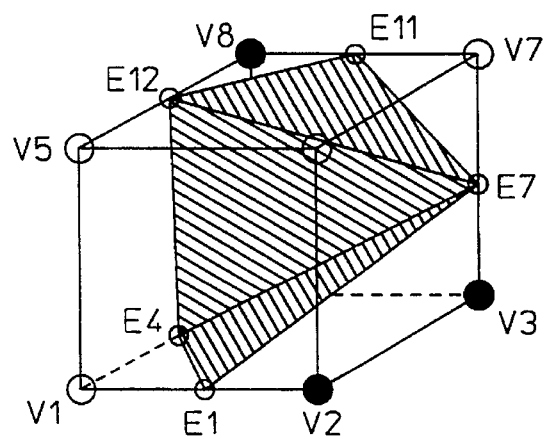
Figure 6H:
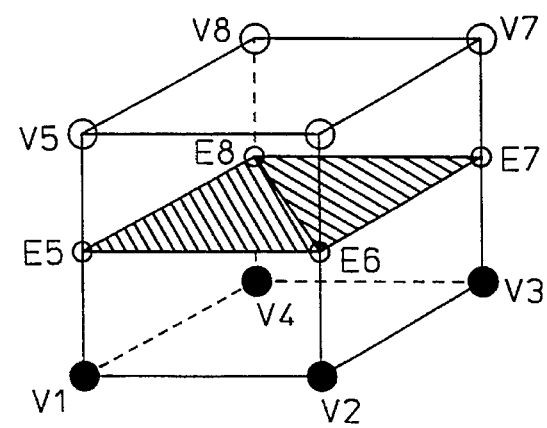

FIGS. 6A–6H show how polygonal networks partition the cubic cell for cases 1–8 shown in FIGS. 5A–5O. Specifically, FIG. 6A illustrates case 1 of FIG. 5A, FIG. 6B illustrates case 2 of FIG. 5B, FIG. 6C illustrates case 3 of FIG. 5C, FIG. 6D illustrates case 4 of FIG. 5D, FIG. 6E illustrates case 5 of FIG. 5E, FIG. 6F illustrates case 6 of FIG. 5F, FIG. 6G illustrates case 7 of FIG. 5G, and FIG. 6H illustrates case 8 of FIG. 5H. It should be briefly noted that no isosurface would partition the cell for case 1 shown in FIG. 5A since all vertices of the cubic cell of FIG. 5A are the same color. Accordingly, in order to illustrate case 1 shown in FIG. 5A, there is no polygonal network shown in FIG. 6A.

FIGS. 6A–6H use the labelling conventions for cube vertices and cube edges introduced in FIGS. 3A and 3B, however the figures have been simplified in that only cube edges intersected by the isosurface are shown as labeled. For purposes of illustration, each polygon vertex point is represented in the figures by a respective small circle, which is positioned between cube vertices to intersect a respective cubic cell edge. Furthermore, for purposes of clear illustration, a surface of each polygon is shown in the figures a shaded.

Though Proposition 1 is sufficient to establish how the isosurface would partition the cell for case 1 though 8 shown in FIGS. 5A–5H, Proposition 1 only partially determines how the isosurface would partition the cell for the remaining cases 9 though 15 shown in FIGS. 5I–5O. As signified by block 419 of the flow chart of FIG. 4, if Proposition 1 does not fully determine the topology of the isosurface, one or more face saddle values are generated.

Figure 7A:
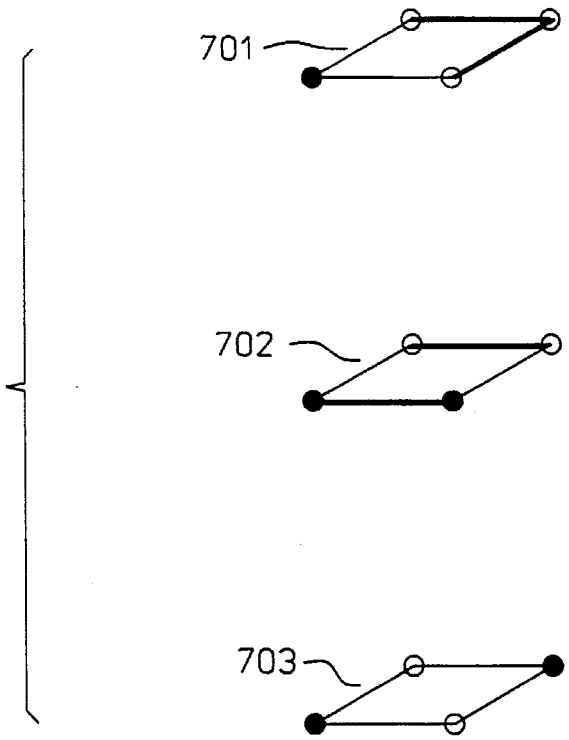
FIG. 7A shows base cases 1–3 for a face of the cubic cell.
Figure 7B:
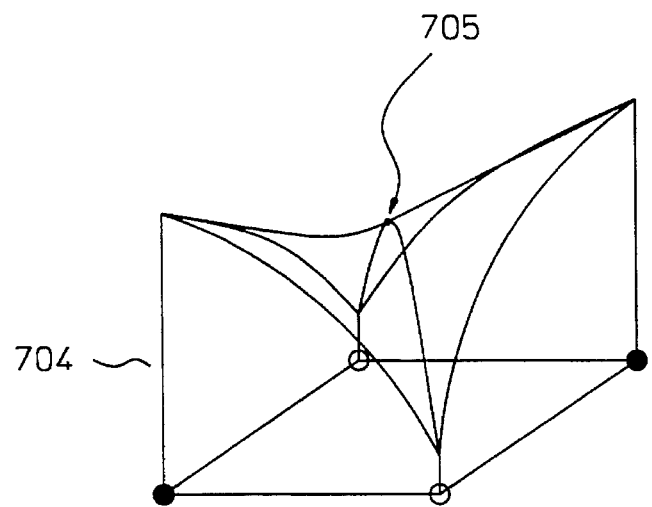
FIG. 7B shows a face saddle point and a face saddle surface corresponding to case 3 of the face shown in FIG. 7A.

It should be noted that owing to rotational symmetries, and the complementary symmetry of interchanging the white and the black colors, there are only three base cases for a face configuration. As shown in FIG. 7A the three base cases for a face configuration are case 1 (701) case 2 (702), and case 3 (703). A face saddle value need only be generated for one of these base cases, namely case 3 (703), wherein a face of the cubic cell has two white vertices and two black vertices such that the two white vertices are positioned diagonally opposite one another and the two black vertices are positioned diagonally opposite one another. The face saddle value is generated from data vectors having location components that are coplanar with one another, corresponding to cube vertices of the face of the cubic cell. The method used to generate each of the face saddle values is discussed in detail later in Appendix A of the present application. An illustration of a three dimensional face saddle surface (704) and a face saddle point (705) is shown in FIG. 7B, wherein the face saddle point has a corresponding face saddle value.

The face saddle value is used in evaluating the following proposition:

Proposition 2: For two white vertices and two black vertices positioned on the same face, wherein cube vertices of the same color are positioned diagonally opposite one another, two cube vertices of the same color are connected if and only if at least one of the following holds true:
(a) The two cube vertices are connected by a path of cube edges on the cubic cell,
(b) The face saddle value and the respective physical property values associated with each of the two cube vertices are all less than the threshold value,
(c) The face saddle value and the respective physical property values associated with each of the two cube vertices are all greater than the threshold value.

As shown in FIG. 4, after one or more saddle values are generated (block 419), Proposition 2 is applied. For example, application of Proposition 2 is sufficient to establish how the isosurface would partition the cubic cell for case 9 (509), as shown in FIG. 5I. From looking at case 9 of FIG. 5, it can be seen that only a front face of this cubic cell has two white vertices and two black vertices wherein the two white vertices are positioned diagonally opposite one another and the two black vertices are positioned diagonally opposite one another. Accordingly, for the cubic cell of case 9, only one face saddle value need be generated.

Figure 8A:
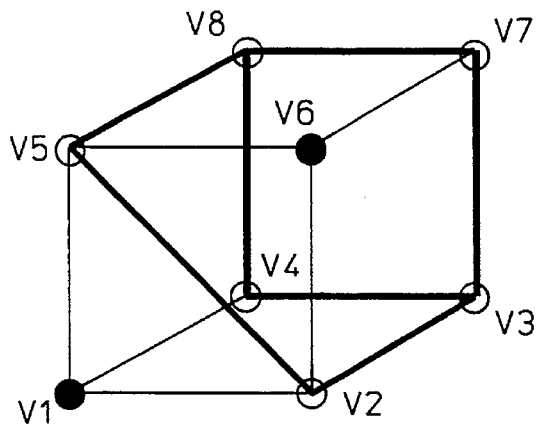
FIG. 8A shows face connected white diagonal vertices for case 9 shown in FIG. 5I, corresponding to a face saddle value that is less than the threshold value.
Figure 9A:
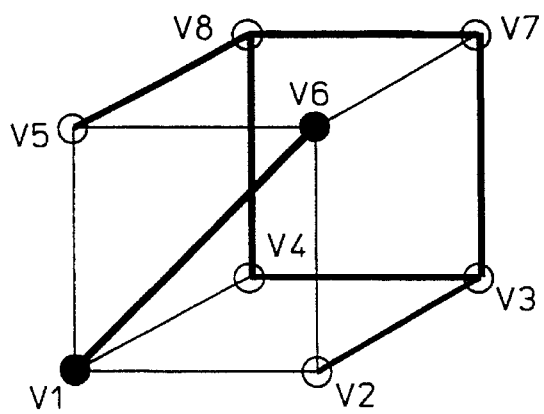
FIG. 9A shows face connected black diagonal vertices for case 9 shown in FIG. 5I, corresponding to a face saddle value that is greater than the threshold value.

Applying Proposition 2 to the front face of the cubic cell of case 9 shown in FIG. 5I, the face saddle value is compared to the threshold value. If the face saddle value is less than the threshold value, a pair of white vertices positioned diagonally opposite one another are connected on the front face, as shown in FIG. 8A. If the face saddle value is greater than the threshold value, a pair of black vertices positioned diagonally opposite one another are connected on the front face, as shown in FIG. 9A. Of course, the present invention actually operates on data vectors. Analogously, Proposition 2 is applied to data vectors corresponding to the vertices of the front face of the cube, thereby determining how the data vectors are connected on the face of the cube.

Proposition 2 establishes how the isosurface would partition the cubic cell for case 9. For example, as shown in FIG. 8A, cube vertices V1 and V6 are not connected, and therefore are not grouped together with respect to the partitioning of the cubic cell by the isosurface. In stark contrast cube vertices V1 and V6 in FIG. 9A are not connected, and therefore are not grouped together with respect to the partitioning of the cell by the isosurface. The topology of the isosurface is fully determined for case 9, since the topology of the isosurface is either consistent with the FIG. 8A or FIG. 9A, depending on whether the face saddle value is greater or less than the threshold value.

Figure 8B:
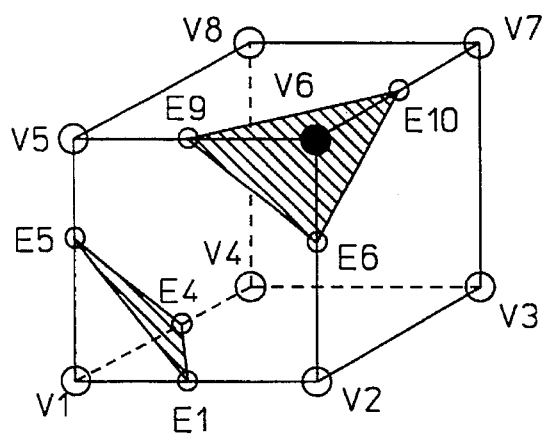
FIG. 8B shows how a network of polygons partitions the cubic cell when cube vertices are connected as shown in FIG. 8A.
Figure 9B:
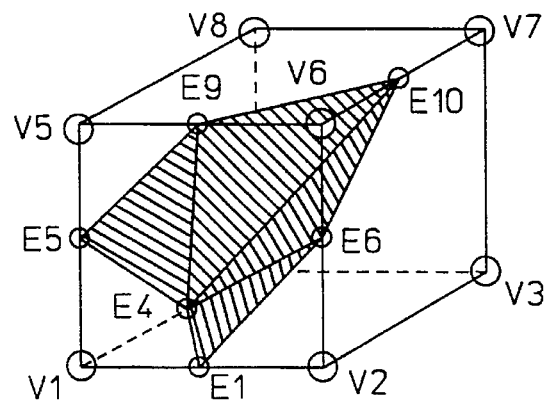
FIG. 9B shows how a network of polygons partitions the cubic cell when cube vertices are connected as shown in FIG. 9A.

Following the flow chart of FIG. 4, once the topology of the isosurface is fully determined (block 421), interpolation is used to generate a set of polygon vertex points (block 416). The polygon vertex points are then selectively linked to construct a network of polygons (block 417) consistent with the topology determined. FIG. 8B shows a network of polygons for the cubic cell having cube vertices connected as shown in FIG. 8A. FIG. 9B shows a network of polygons for the cubic cell having cube vertices connected as shown in FIG. 9A. As shown in these drawings, the topology of the polygonal network of FIG. 8B is very different from the topology of the polygonal network of FIG. 9B.

It is important to note that for a configuration of black and white cube vertices as in case 9 shown in FIG. 5I, the present invention provides two alternative topologies for polygonal networks, as shown in FIGS. 8B and 9B. Furthermore, for each configuration of black and white cube vertices and the corresponding selected threshold value, the present invention generates a display based on the alternative polygonal network topology that is consistent with the isosurface topology. In contrast, for each configuration of cubic vertices shown in FIGS. 3A–3N of Cline ('098) and of Cline ('876), a single respective topology for a polygonal network is shown in FIGS. 4A–4N of Cline ('098) and of Cline ('876). For example, for a configuration of cubic vertices as shown in FIG. 3C of Cline ('876), there corresponds a single topology for a polygonal network, as shown in FIG. 4C of Cline ('876). This example is particularly appropriate because, after suitable rotation, the configuration of vertices shown in FIG. 3C of Cline ('876) is equivalent to the configuration of black and white cubic vertices of case 9 shown in FIG. 5I. Taken as a whole, the teachings of Cline ('098) and Cline ('876) are distinguished from the present invention, which provides the alternative topologies needed to generate polygonal networks that are topologically consistent with a corresponding isosurface.

Though application of Proposition 1 is sufficient to establish how the isosurface partitions the cell for case 1–8 shown in FIGS. 5A–5H, and though subsequent application of Proposition 2 is sufficient to establish how the isosurface partitions the cell for case 9 shown in FIG. 5I, more work must be done to determine how the isosurface partitions the cell for the remaining cases 10–15 shown in FIGS. 5J–5O. As indicated by block 422 of the flow chart in FIG. 4, a body saddle value is generated if Propositions 1 and 2 do not fully determine the topology of the isosurface. The body saddle value is only generated when there is no boundary connection between a pair of cube vertices of the same color located at diagonally opposite corners of the body of the cubic cell. The body saddle value is generated from data vectors having location components that are spatially coadjacent with one another. In other words, the body saddle value is generated from eight data vectors corresponding to the eight vertices of the cubic cell. The actual mathematical equation used to generate the body saddle value are discussed in detail later in Appendix A of the present application.

The body saddle value is used in evaluating the following proposition:

Proposition 3: Two cube vertices of the same color located at diagonally opposite corners of the body of the cubic cell are connected if and only if at least one of the following holds true:
(a) The two cube vertices are boundary connected,
(b) The body saddle value and the respective physical property values associated with each of the two cube vertices are all less than the threshold value,
(c) The body saddle value and the respective physical property values associated with each of the two cube vertices are all greater than the threshold value.

Looking at the cubic cell of case 10 shown in FIG. 5J, it should be briefly noted that none of the faces of the cubic cell of case 10 require generating a face saddle value. However, the cubic cell of case 10 does have a pair of vertices of the same color located at diagonally opposite corners of the body of the cubic cell, wherein the pair of vertices is not boundary connected. Therefore, there is a need to generate a corresponding body saddle value. In accordance with block 422 of the flow chart of FIG. 4, the corresponding body saddle value is generated for case 10 shown in FIG. 5J.

Figure 10A:
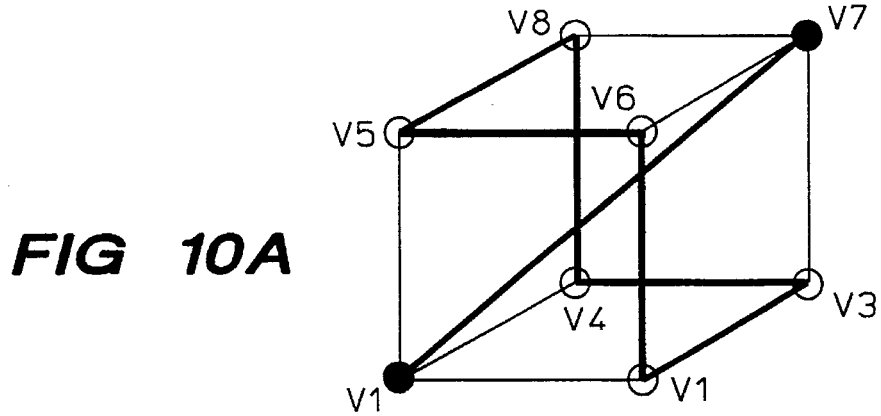
FIG. 10A shows body connected black vertices for case 10 shown in FIG. 5J, corresponding to a body saddle value that is greater than the threshold value.
Figure 11A:
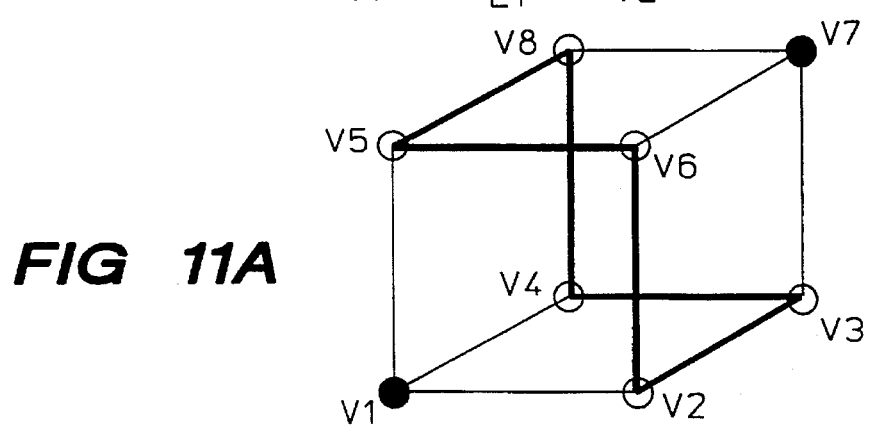
FIG. 11A shows disconnected black vertices for case 10 of FIG. 5J, corresponding to a body saddle value that is less than the threshold value.

In accordance with block 423 of the flow chart FIG. 4, proposition 3 is applied to the cubic cell of case 10 shown in FIG. 5J, so that the corresponding body saddle value is compared to the threshold value. If the body saddle value is greater than the threshold value, the pair of black vertices positioned on diagonally opposite corners of the body of the cell are connected within the body of the cell, as shown in FIG. 10A. However, there is no body connection between the pair of black vertices when the body saddle value is less than the threshold, as shown in FIG. 11A.

Application of Proposition 3 establishes how the isosurface partitions the cubic cell for case 10 shown in FIG. 5J. For example, as shown in FIG. 10A, black cube vertices V1 and V7 are connected, and therefore are properly grouped together with respect to the partitioning of the cubic cell by the isosurface. In contrast black cube vertices V1 and V7 shown in FIG. 11A are not connected, and therefore are not grouped together with respect to the partitioning of the cell by the isosurface. The topology of the isosurface is fully determined for case 10, since the topology of the isosurface is either consistent with the FIG. 10A or FIG. 11A, depending on whether the body saddle value is greater or less than the threshold value.

Following the flow chart of FIG. 4, once the topology of the isosurface is fully determined by applying Proposition 3 (block 423), interpolation is used to generate a set of polygon vertex points (block 416). The polygon vertex points are then linked to construct a network of polygons (block 417) consistent with the topology determined.

Figure 10B:
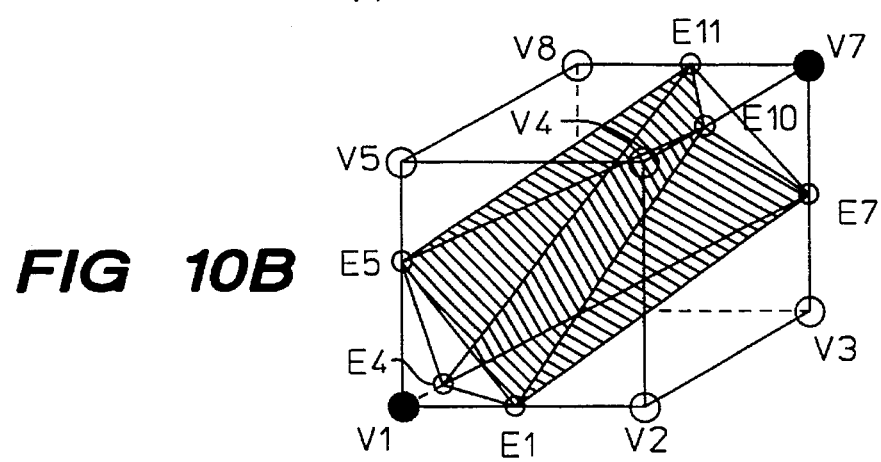
FIG. 10B shows how a network of polygons partitions the cubic cell when cube vertices are connected as shown in FIG. 10A.
Figure 11B:
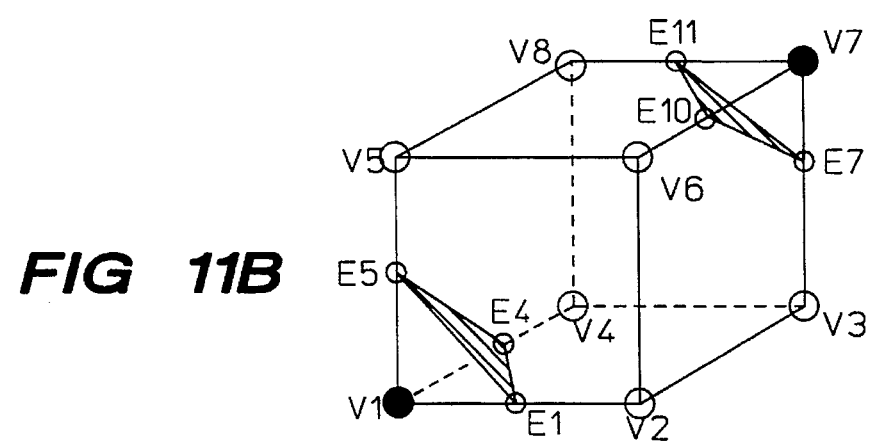
FIG. 11B shows how a network of polygons partitions the cubic cell when the cube vertices are connected as shown in FIG. 11A.

In accordance with the topology of the isosurface that would partition cubic cell having cube vertices connected as shown in FIG. 10A, FIG. 10B shows a network of polygons forming a tube-like structure within the cubic cell. For purposes of clear illustration in FIG. 10B, an outer surface of the tube-like structure is shown as shaded, while an inner surface of the tube-like structure, visible at opposing ends of the tube-like structure, is shown as unshaded. It should be noted that in FIG. 10B, black cube vertices V1 and V7 are not partitioned by the network of polygons. In contrast, FIG. 11B shows a network of polygons for the cubic cell partitioning black cube vertices V1 and V7. This partitioning of black cube vertices V1 and V7 shown in FIG. 11B is in accordance with the topology suggested by FIG. 11A, wherein black cube vertices V1 and V7 are not connected. As shown in these drawings, the topology of the polygonal network of FIG. 10B is very different from the topology of the polygonal network of FIG. 11B.

It is important to note that for a configuration of black and white cubic vertices as shown in case 10 shown in FIG. 5J, the present invention provides two alternative topologies for polygonal networks, as shown in FIGS. 10B and 11B. Furthermore, for each configuration of black and white cube vertices and the corresponding selected threshold value, the present invention generates a display based on the alternative polygonal network topology that is consistent with the isosurface topology. As discussed previously, such alternative topologies contrast with the teachings of Cline. For each configuration of cubic vertices shown in FIGS. 3A–3N of Cline ('098) and of Cline ('876), a single respective topology for a polygonal network is shown in FIGS. 4A–4N of Cline ('098) and of Cline ('876). For example, for a configuration of cubic vertices as shown in FIG. 3D of Cline ('876), there corresponds a single topology for a polygonal network, as shown in FIG. 4D of Cline ('876). This example is particularly appropriate because the configuration of vertices shown in FIG. 3D of Cline ('876) is equivalent to the configuration of black and white cubic vertices of case 10 of FIG. 5J, shown herein. Taken as a whole, the teachings of Cline ('098) and Cline ('876) are distinguished from the present invention, which provides the alternative topologies needed to generate polygonal networks that are topologically consistent with a corresponding isosurface.

As yet another example, the method of the flow chart of FIG. 4 is applied to case 11 shown in FIG. 5K. In accordance with block 419 of the flow chart of FIG. 4, a single face saddle value is generated. Upon viewing FIG. 5K it becomes clear that only a single face saddle value is generated because only a right side face of the cubic cell of case 11 has two white vertices and two black vertices wherein the two white vertices are positioned diagonally opposite one another and the two black vertices are positioned diagonally opposite one another.

Figure 12B:
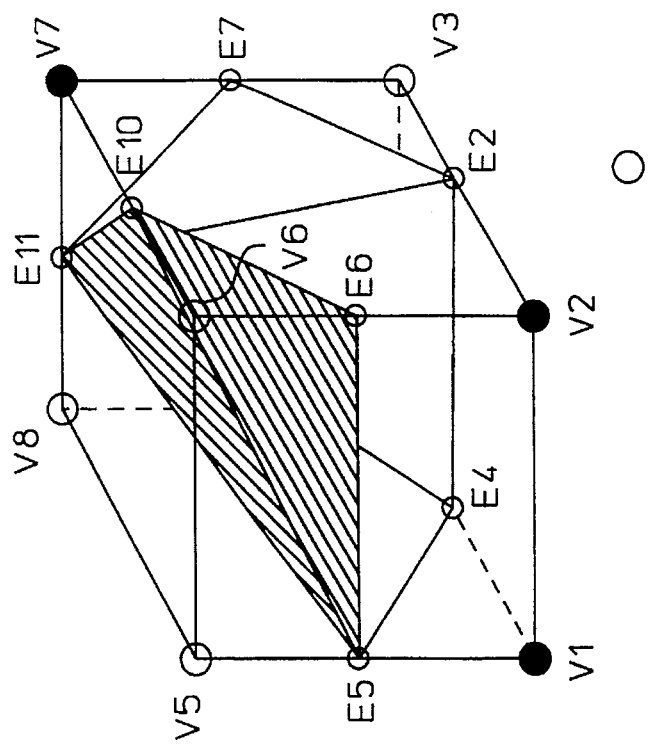
FIG. 12B shows how a network of polygons partitions the cubic cell when cube vertices are connected as shown in FIG. 12A.
Figure 12A:
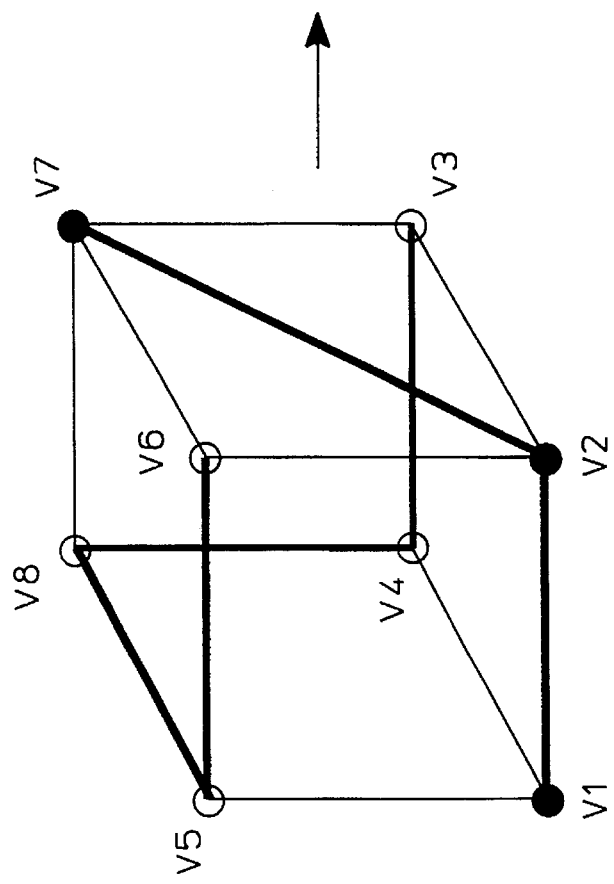
FIG. 12A shows face connected black diagonal vertices for case 11 shown in FIG. 5K, corresponding to a face saddle value that is greater than the threshold value.

Applying Proposition 2 to the right side face of the cubic cell of case 11 shown in FIG. 5K, the face saddle value is compared to the threshold value. If the face saddle value is greater than the threshold value, the pair of black vertices positioned diagonally opposite one another are connected on the right side face, as shown in FIG. 12A by a diagonal line heavily drawn between black cube vertices V2 and V7. If the face saddle value is less than the threshold value, the pair of black vertices positioned diagonally opposite one another are not connected on the right side face. Instead, the pair of white vertices positioned diagonally opposite one another are connected on the front face, as shown in FIG. 13 by a diagonal line heavily drawn between white cube vertices V3 and V6.

For the cubic cell shown in FIG. 12A, all white vertices are boundary connected and all black vertices are boundary connected. Therefore, if cubic vertices are connected as shown FIG. 12A, then application of Proposition 2 (block 420 of FIG. 4) is sufficient to establish how the isosurface would partition the cubic cell. Accordingly, for the configuration of black and white cubic vertices shown in FIG. 12A, the topology is fully determined (block 421 of FIG. 4) and there is no need to generate a body saddle value for the cubic cell shown in FIG. 12A. Following the flow chart of FIG. 4, once the topology of the isosurface is fully determined (block 421), interpolation is used to generate a set of polygon vertex points (block 416). The polygon vertex points are then linked to construct a network of polygons (block 17). FIG. 12B shows a network of polygons consistent with the topology of an isosurface that would the cubic cell having cube vertices connected as shown FIG. 12A. As shown in FIG. 12B, the network of polygons forms a rotated "U" shaped surface structure. For purposes of clarity in FIG. 12B, an outer surface of the "U" shaped structure is shown as being shaded, while an inner surface of the "U" shaped structure is shown as being unshaded. In the figures, an arrow is drawn from FIG. 12A to FIG. 12B to clarify their relationship.

Figure 13:
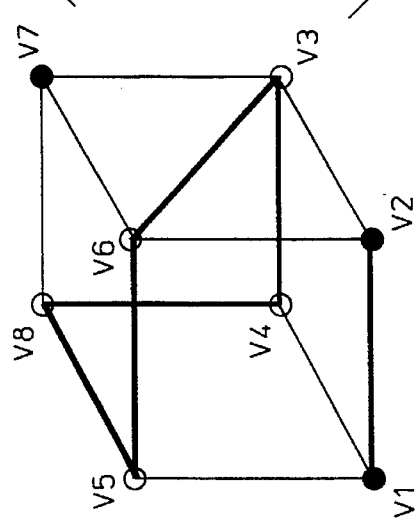
FIG. 13 shows face connected white diagonal vertices for case 11 shown in FIG. 5K, corresponding to a face saddle value that is less than the threshold value.

For the cubic cell shown in FIG. 13, not all of the black cube vertices are boundary connected. Specifically, in FIG. 13 one black cube vertex, V7, is shown as being not boundary connected to any other black cube vertices. Therefore, Proposition 2 (block 420 of FIG. 4) is not sufficient to establish how the isosurface partitions the cubic cell shown in FIG. 13. Accordingly, the topology is not fully determined (block 421 of FIG. 4), and therefore a body saddle value is generated (block 422 of FIG. 4).

Figure 14B:
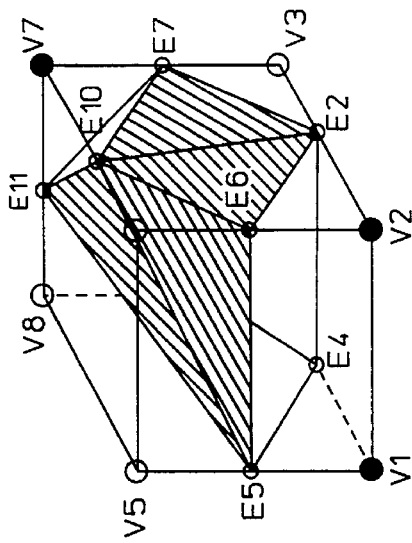
FIG. 14B shows how a network of polygons partitions the cubic cell when cube vertices are connected as shown in FIG. 14A.
Figure 14A:
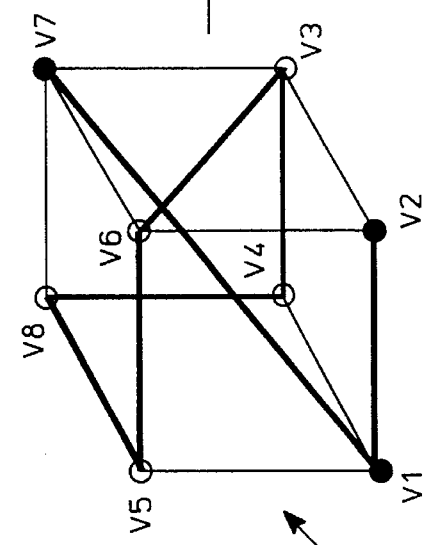
FIG. 14A shows body connected black vertices for the cubic cell shown in FIG. 13, corresponding to a body saddle value that is greater than the threshold value.

In accordance with block 423 of FIG. 4, Proposition 3 is applied to the cubic cell shown in FIG. 13 so that the body saddle value is compared to the threshold value. If the body saddle value is greater than the threshold value, then black cube vertices V1 and V7, which are positioned on diagonally opposite corners of the body of the cell, are connected within the body of the cell, as shown in FIG. 14A by a line heavily drawn though the body of the cubic cell between the black cube vertices V1 and V7. In the figures, an arrow is drawn from FIG. 13 to FIG. 14A to clarify their relationship. If the body saddle value is less than the threshold value, there is no body connection between the pair of black vertices positioned on diagonally opposite corners of the body of the cell, as shown in FIG. 15A. In the figures, an arrow is also drawn from FIG. 13 to FIG. 15A to clarify their relationship.

Application of Proposition 3 establishes how the isosurface partitions the cubic cell for the cubic cell shown in FIG. 13. For example, as shown in FIG. 14A, V1 and V7 are connected and therefore are properly grouped together with respect to the partitioning of the cubic cell by the isosurface. In contrast V1 and V7 shown in FIG. 15A are not connected and therefore are not grouped together with respect to the partitioning of the cell by the isosurface. The topology of the isosurface is fully determined for the cubic cell having cube vertices connected as shown in FIG. 13, since the topology of the isosurface is consistent with either FIG. 14A or FIG. 15A, depending on whether the body saddle value is greater or less than the threshold value.

Following the flow chart of FIG. 4, once the topology of the isosurface is fully determined by applying Proposition 3 (block 423), interpolation is used to generate a set of polygon vertex points (block 416). The polygon vertex points are then linked to construct a network of polygons (block 417) consistent with the topology determined. FIG. 14B shows a network of polygons for the cubic cell having cubic vertices connected as shown in FIG. 14A. The network of polygons shown in FIG. 14B forms a rotated funnel-like structure within the cubic cell. For purposes of clear illustration in FIG. 14B, an outer surface of the funnel-like structure is shown as shaded, while an inner surface of the funnel-like structure, visible at opposing ends of the funnel-like structure, is shown as unshaded. In the figures, an arrow is drawn from FIG. 14A to FIG. 14B to clarify their relationship. As shown in FIG. 14B, cube vertices V1 and V7 are not partitioned by the network of polygons.

Figure 15B:
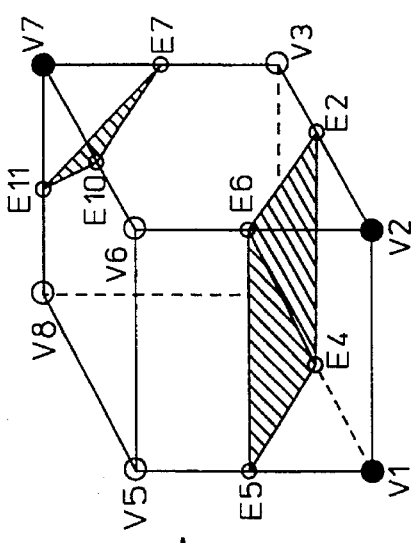
FIG. 15B shows how a network of polygons partitions the cubic cell when cube vertices are connected as shown in FIG. 15A.
Figure 15A:
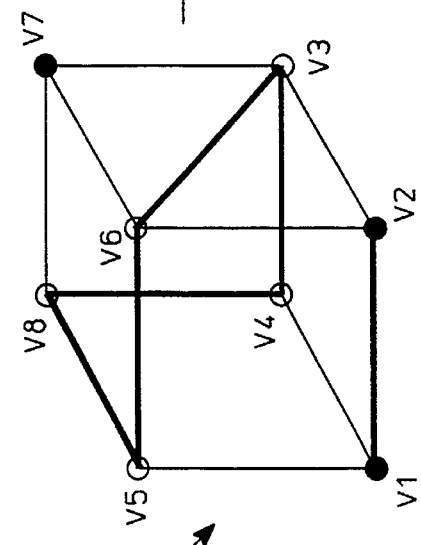
FIG. 15A shows body disconnected black vertices for the cubic cell of FIG. 13, corresponding to a body saddle value that is less than the threshold value.

In contrast, FIG. 15B shows a network of polygons for the cubic cell partitioning cube vertices V1 and V7. This partitioning of cube vertices V1 and V7 shown in FIG. 15B is in accordance with cube vertices connected as shown in FIG. 15A. In the figures, an arrow is drawn from FIG. 15A to FIG. 15B to clarify their relationship. As shown in the drawings discussed, the topology of the polygonal networks of FIG. 12B, FIG. 14B, and FIG. 15B are all very different from one another.

It is important to note that for a configuration of black and white cubic vertices as shown in case 11 shown FIG. 5K, the present invention provides three alternative topologies for polygonal networks, as shown in FIGS. 12B, 14B, and 15B. Furthermore, for each configuration of black and white cube vertices and the corresponding selected threshold value, the present invention generates a display based on the alternative polygonal network topology that is consistent with the isosurface topology. As discussed previously, such alternative topologies contrast with the teachings of Cline. For each configuration of cubic vertices shown in FIGS. 3A–3N of Cline ('098) and of Cline ('876), a single respective topology for a polygonal network is shown in FIGS. 4A–4N of Cline ('098) and of Cline ('876). For example, for a configuration of cubic vertices as shown in FIG. 3F of Cline ('876), there corresponds a single topology for a polygonal network, as shown in FIG. 4F of Cline ('876). This example is particularly appropriate because, upon duly considering the interchanging of symmetric complementary white and the black colors, the configuration of vertices shown in FIG. 3F of Cline ('876) is substantially equivalent to the configuration of black and white cubic vertices of case 11 of FIG. 5, shown herein. As discussed previously, taken as a whole, the teachings of Cline ('098) and Cline ('876) are distinguished from the present invention, which provides the alternative topologies needed to generate polygonal networks that are topologically consistent with a corresponding isosurface.

The previous discussions have illustrated how the method of the flow chart of FIG. 4 generates respective topologically consistent polygonal networks for each of base cases 1 though 11 of FIGS. 5A–5K. In a similar manner as discussed previously, the method of the flow chart is used to generate respective topologically consistent polygonal networks for each of the remaining base cases 12 though 15 shown in FIGS. 5L–5O.

As discussed, the method of the present invention was applied to an exemplary cubic cell producing beneficial results. Assuming that there are a number $N^3$ of data vectors, then the three dimensional grid divides the body being examined into a number $(N-1)^3$ of cubic cells. In theory, the method described in the flow chart of FIG. 4 could be applied to each of the $(N-1)^3$ cubic cells. However this would be wasteful, since the isosurface will only intersect a number M of cubic cells and M may be much smaller than $(N-1)^3$.

In generating a piecewise polygonal approximation of the isosurface, the preferred embodiment of the present invention avoids this wastefulness by further including a preprocessing step in the sorting step discussed previously. The preprocessing step comprises preprocessing the data vectors of the cells into a hierarchical data structure that can store summary information to prevent useless exploration of regions of little or no interest within the body. Computer science students having ordinary skill are familiar with binary search trees or B-trees. The preferred embodiment of the present invention uses Octrees, which are a variation that feature eight way branching and are well known to those with ordinary skill in the art of designing computer graphics systems for imaging applications. The $(N-1)^3$ cubic cells are preprocessed into an octree, so that for a given threshold value it is possible to process all M cells that intersect the isosurface in time M log (N). Such use of octrees is described, for example, in Wilhelms and Van Gelder, "Octrees for Faster Isosurface Generation", Computer Graphics, vol. 2, no. 4, pp 227–234 (1990). This article provides a lengthy discussion of the use of octrees including illustrative experimental data.

Figure 2A:
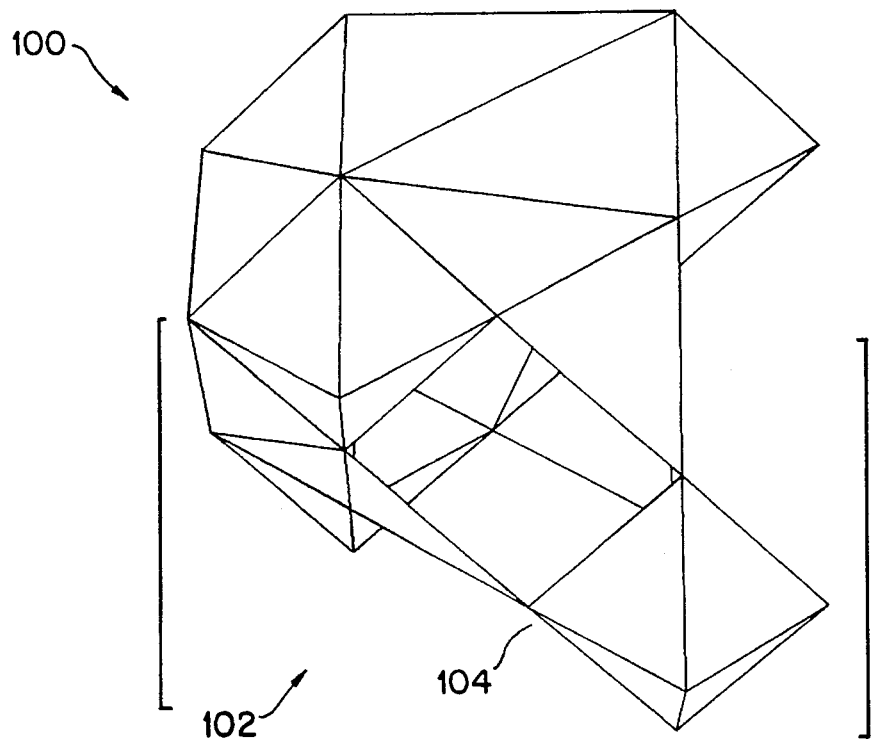
FIG. 2A shows a coarse display of an isosurface, generated according to the prior art.
Figure 2B:
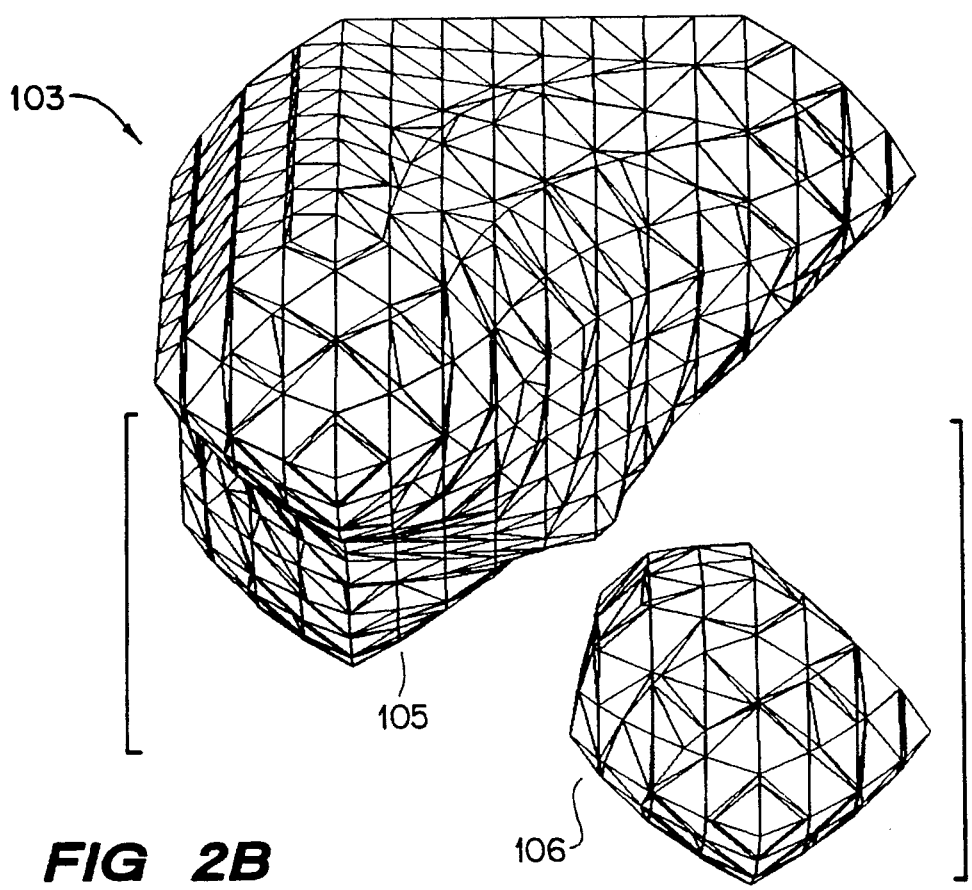
FIG. 2B shows how a feature shown in FIG. 2A seems to disappear when a user elects to view a refined display of the feature.
Figure 16B:
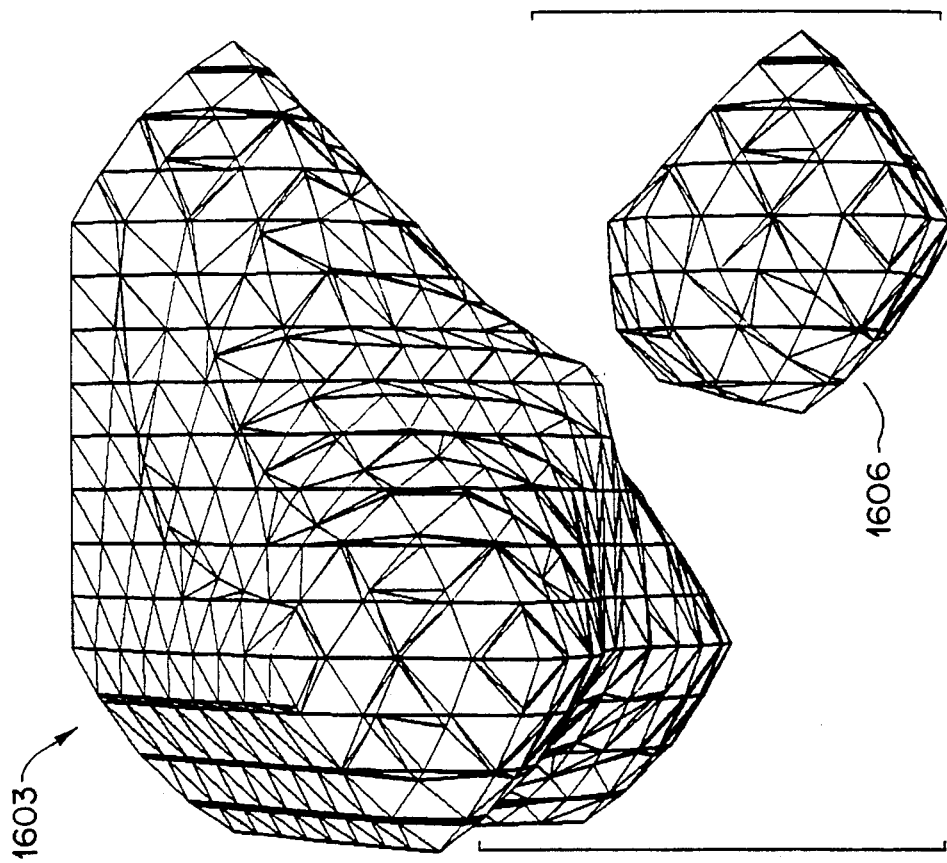
FIG. 16B shows how features shown in FIG. 16A are still present when a user elects to view a refined display of the features.
Figure 16A:
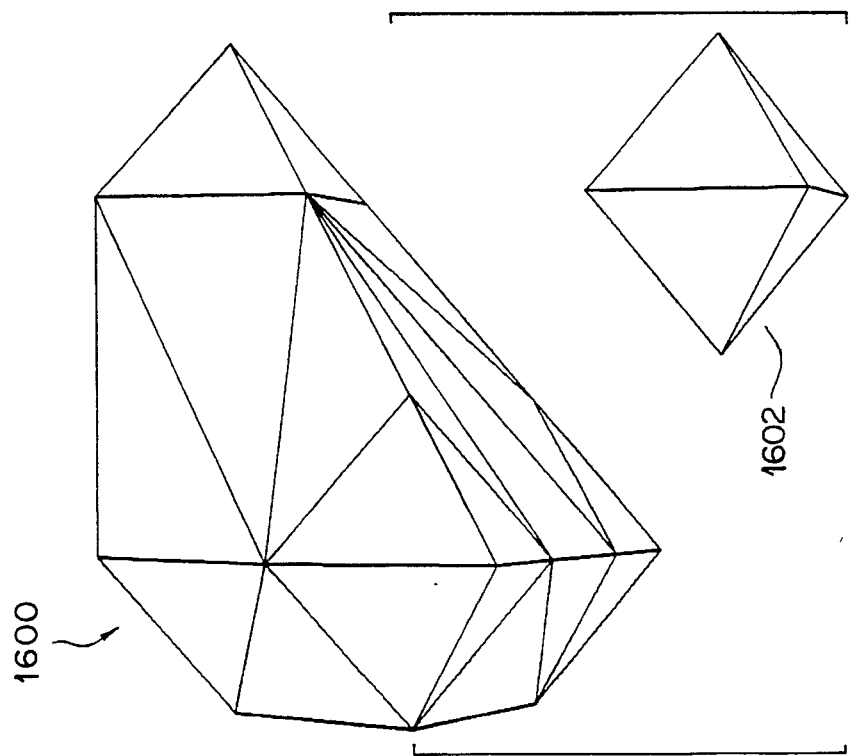
FIG. 16A shows a coarse display of an isosurface generated according to the present invention.

The following illustrative example points out the great value of the method of the present invention in generating a network of polygons that is topologically consistent with an interpolant isosurface. For the sake of this example it will again be said that a surgical patient's brain is being examined by the CAT scan machine discussed earlier. The interpolant isosurface of interest corresponds to the outer layer of a brain tumor, and the present invention is used to generate coarse and refined piecewise polygonal approximations of the interpolant isosurface of interest. FIG. 16A shows a coarse graphical display generated by displaying the coarse polygonal approximation of the interpolant isosurface on a graphics display device. The coarse graphical display is viewed by a doctor who is striving to determine whether the shape and location of the brain tumor will allow safe surgical removal. Upon viewing the coarse display, the doctor sees a coarse display of a tumor 1600 and a coarse display of a small, disconnected island 1602 some distance apart from the tumor. The doctor commands the system to "zoom in" on the tumor and the island. In response to the doctor's command, the system generates additional polygon vertex points and links the additional polygon vertex points, thereby producing the refined polygonal approximation and an expanded display of the feature under study, as shown in FIG. 16B. Because the coarse polygonal approximation and the refined polygonal approximation are each topologically consistent with the interpolant isosurface, there are no surprising topological changes when the coarse display is refined. The coarse display of the tumor 1600 in FIG. 16A appears as a refined display of the tumor 1603 in FIG. 16B. Similarly, the coarse display of the small island 1602 in FIG. 16A appears as a refined display of the small island 1603 in FIG. 16B. This is reassuring to the doctor, in contrast to the example discussed previously herein with respect to FIGS. 2A and 2B.

Figure 17:
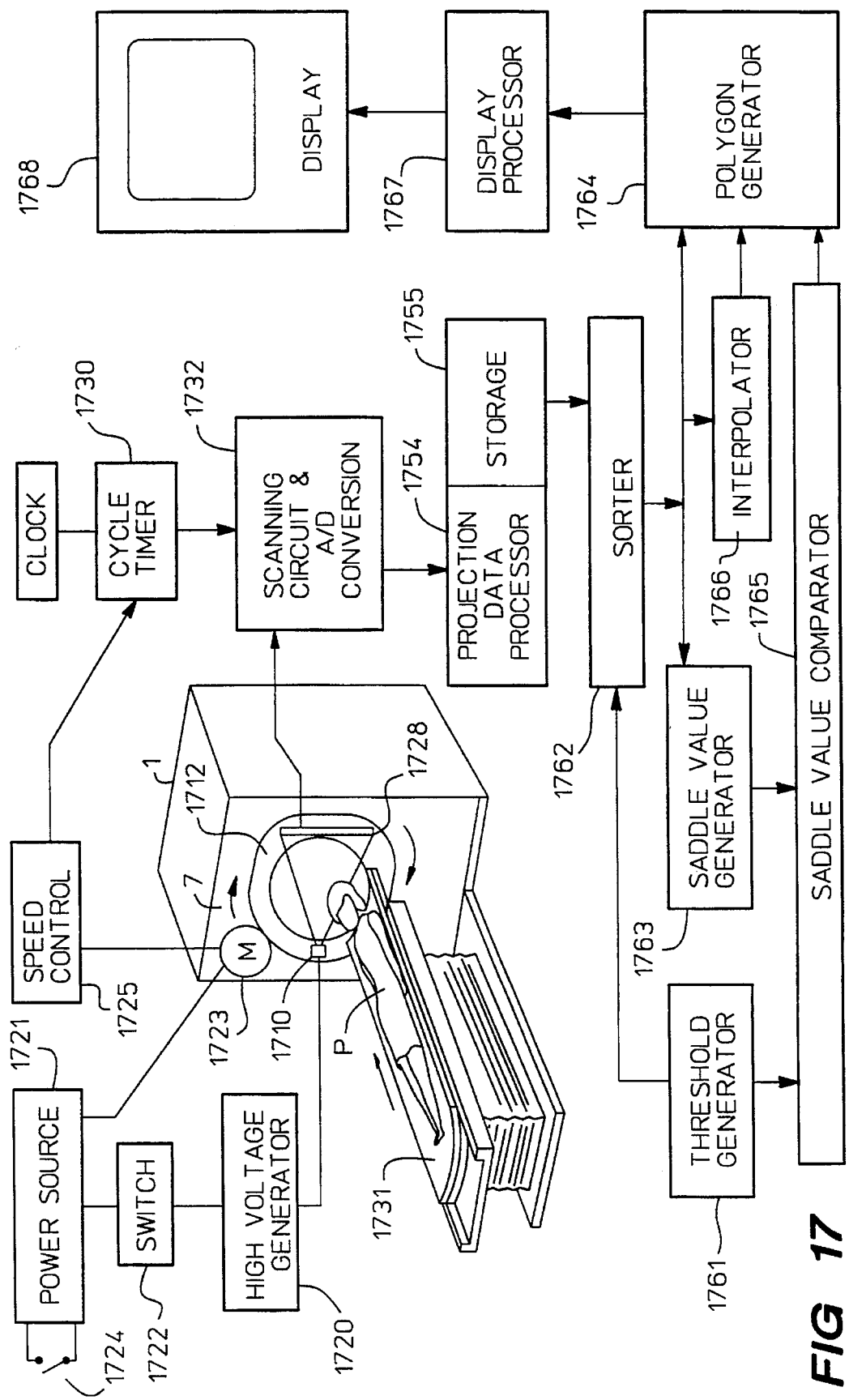
FIG. 17 shows a block diagram of a CAT scan apparatus used in conjunction with the present invention.

FIG. 17 illustrates a simplified block diagram of CAT scan apparatus which may be employed in conjunction with a preferred embodiment of the present invention to generate a three dimensional signal pattern. The CAT scan apparatus examines a body P by means of a fan shaped radiation beam which traverses a set of paths across a section of the body. As shown in FIG. 17, an X-Ray source 1710 is mounted on a gantry frame 1712 that encircles the body being examined. The operating voltage for the X-ray source is obtained from a suitable conventional high-voltage generator 1720, so that the source 1710 will produce the fan shaped beam of radiation when high-voltage is applied thereto. The high-voltage generator is energized from a power source 1721, for example, by way of a switch 1722.

The power source 1721 is also employed to directly energize the motor 1723 which drives the frame 1712 to orbit about the body, for example in a clockwise direction as shown by the arrows adjacent the frame. A switch 1724 or other conventional control device may be connected to the power source 1721, in order to enable initiation of a measurement sequence. A speed control circuit 1725 is provides an output control signal when the speed of the motor is proper for the taking of measurements. The speed control circuit may constitute, for example, a tachometer, having a threshold circuit for providing an output when the motor speed is at a determined level. The output of the speed control 1725 may be employed to control the switch 1722, as shown in the drawings so that energizing potential is applied to the high-voltage generator when the frame 1712 is driven at the desired speed for making measurements.

A band of detectors 1728 is mounted on the frame opposing the X-Ray source in order to provide convolved projection signals that correspond to an X-Ray attenuation signal pattern. Both the source and the band of detectors lie in a plane of the section of the body being examined. The fan shaped beam of radiation is projected through the section of the body. The band of detectors measures radiation transmitted along the set of beam paths across the fan. Under control of scanning pulses sequentially obtained from a cycle timer 1730 coupled to a clock, a scanning circuit & A/D conversion unit 1732 receive a sequence of outputs corresponding to the different detectors. The output of each detector represents a line integral of attenuation values measurable along a respective one of the beam paths. The fan-shaped beam subtends an angle sufficient to include the entire region of interest in the plane of the body. Accordingly, a complete scan of the plane can be made merely by orbiting the frame supporting the source and detectors around the body to accumulate the convolved projection signals at different angular positions. The band of detectors moves in synchronism with the beam in order to generate the convolved projection signals. After each complete scan of the plane, a patient platform 1731 supporting the body advances toward the gantry frame so that successive planar sections of the body are scanned.

The convolved projection signals are digitized by the analog to digital conversion unit and are received by a projection data processor 1754 and storage device 1755. The projection data processor employs methods well known to those with ordinary skill in the art of computer aided tomography to transform the digitized convolved projection signals into X-Ray attenuation data vectors. The X-Ray attenuation data vectors correspond to X-Ray attenuation at spaced grid apart locations within the section of body being examined. Examples of such methods include an appropriate convolution-type implementation of the Radon inversion formula as discussed in "Image reconstruction from projections, the fundamentals of computerized tomography" by Gabor Herman, Academic Press 1980, pp. 161–172. As the patient platform 1731 advances, the X-Ray attenuation data vectors corresponding to each successive plane are stored in a storage memory, 1755, thereby completing a set of three dimensional X-Ray attenuation data vectors corresponding to the three dimensional X-Ray attenuation signal pattern. Each data vector has an X-Ray attenuation component and a location component corresponding to a respective three dimensional grid location within the body.

In accordance with the principles of the present invention discussed previously, a threshold generator 1761 generates an X-Ray attenuation threshold value. For example, an operator generates the threshold value by typing the threshold value at a keyboard. The threshold value and the three dimensional X-Ray attenuation signal pattern define a three dimensional isosurface partitioning the three dimensional X-Ray attenuation signal pattern into pattern groupings.

The sorter 1762 receives the threshold value from the threshold generator and data vectors from the storage memory. The sorter sorts data vectors into a first and second group; the first group including data vectors each having a X-Ray attenuation component less than the threshold value, the second group including data vectors each having an X-Ray attenuation component greater than the threshold value.

As shown in FIG. 17, a saddle value generator 1763 generates face saddle values and body saddle values from the sorted data vectors in accordance with principles of the present invention discussed previously. The saddle value comparator 1765 compares saddle values to the threshold value received from the threshold generator. The interpolator 1766 receives sorted data vectors from the sorter 1762 and generates polygon vertex points, which approximately lie on the isosurface at locations between pairs of adjacent data vectors. A polygon generator 1764 analyzes the sorted data vectors and the output of the saddle value comparator, applying Propositions 1–3 thereto as discussed previously herein. From such application of Propositions 1–3, the polygon generator determines how the isosurface would partition the three dimensional X-Ray attenuation signal pattern. The polygon generator receives the polygon vertex points from the interpolator and links the polygon vertex points to generate a network of polygons that is topologically consistent with the isosurface. A display processor 1767 is in cooperative communication with the polygon generator. Based upon the network of polygons generated, the display processor 1767 controls a display device 1768 to generate a topologically consistent visual display depicting the isosurface. In a preferred embodiment of the present invention the projection data processor 1754, the sorter 1762, the saddle value generator 1763, the saddle value comparator 1765, the interpolator 1766, the polygon generator 1764 and the display processor 1767 are all essentially embodied in microprocessors executing suitable instructions.

Figure 18:
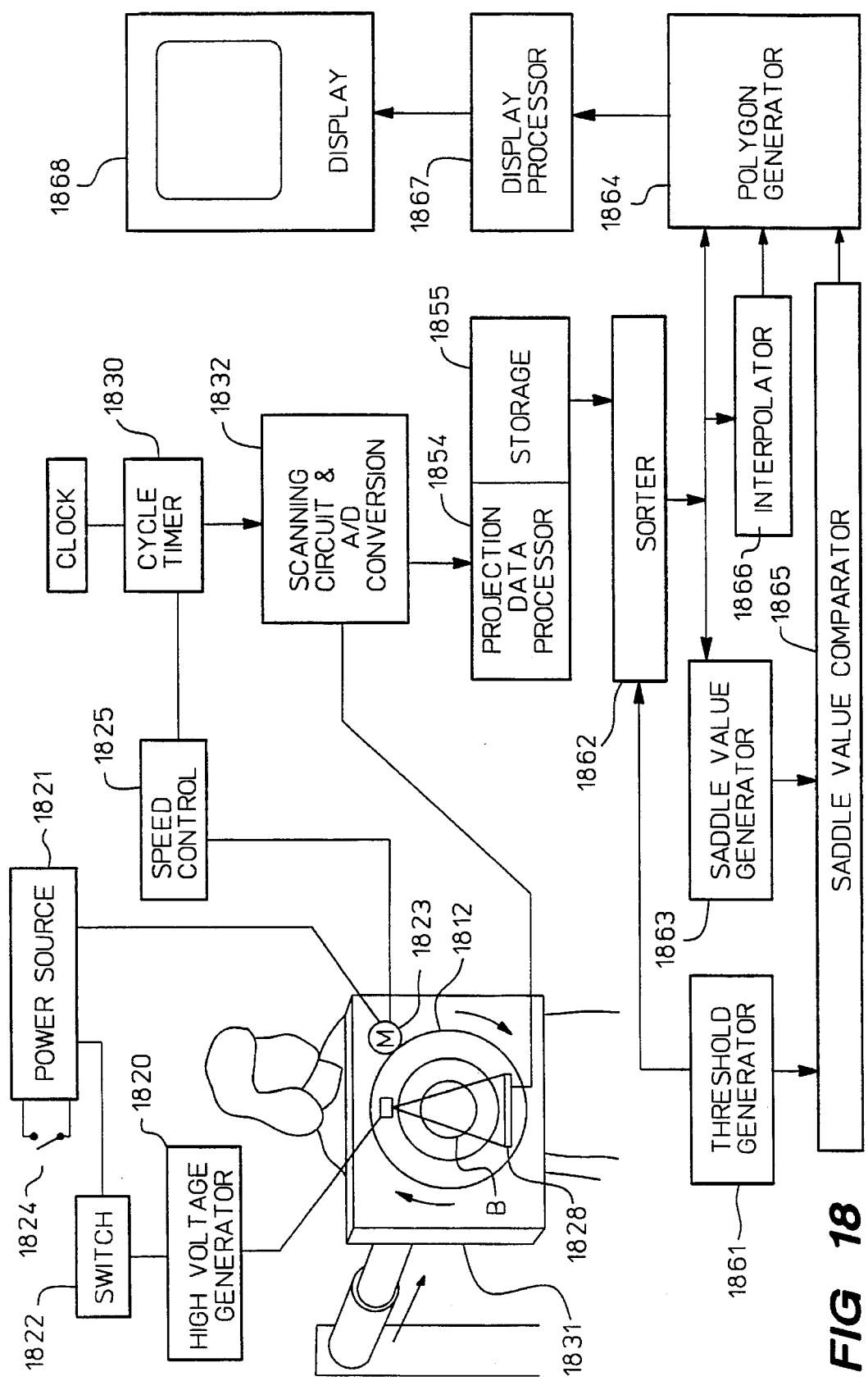
FIG. 18 shows a block diagram of a computed tomography scanning apparatus employing ultrasound used in conjunction with the present invention.

FIG. 18 therein illustrates a simplified block diagram of computer aided tomography scanning apparatus employing ultrasound that may be used in conjunction with an alternative embodiment of the present invention to generate another three dimensional signal pattern. The scanning apparatus examines a body B by means of a fan shaped ultrasonic acoustic beam which traverses a set of paths across a section of the body. As shown in FIG. 18, an ultrasonic transducer 1810 is mounted on a gantry frame 1812 that encircles the body being examined. For example, the body may be a breast inserted in the frame and suitably coupled to the transducer for the purpose of performing ultrasonic mammography using the scanning apparatus. The ultrasonic transducer is constructed using a suitable piezoelectric material, for example lead zirconate titanate. The operating voltage for the ultrasonic transducer is obtained from a suitable conventional high-voltage generator 1820, so that the ultrasonic transducer will produce the fan shaped acoustic beam when high-voltage is applied thereto. The high-voltage generator is energized from a power source 1821, for example, by way of a switch 1822.

The power source 1821 is also employed to directly energize the motor 1823 which drives the frame 1812 to orbit about the body, for example in a clockwise direction as shown by the arrows adjacent the frame. A switch 1824 or other conventional control device may be connected to the power source 1821, in order to enable initiation of a measurement sequence. A speed control circuit 1825 is provided for providing an output control signal when the speed of the motor is proper for the taking of measurements. The speed control circuit may constitute, for example, a tachometer, having a threshold circuit for providing an output when the motor speed is at a determined level. The output of the speed control 1825 may be employed to control the switch 1822, as shown in the drawings so that energizing potential is applied to the high-voltage generator when the frame 1812 is driven at the desired speed for making measurements.

A band of acoustic detectors 1828 is mounted on the frame opposing the ultrasonic transducer and suitably coupled to the body in order to provide a set convolved projection signals that correspond to an acoustic attenuation signal pattern. Both the transducer and the band of ultrasonic detectors lie in a plane of the section of the body being examined. The fan shaped acoustic beam is projected through the section of the body. The band of detectors measures ultrasonic waves transmitted along the set of beam paths across the fan. Under control of scanning pulses sequentially obtained from a cycle timer 1830 coupled to a clock, a scanning circuit & A/D conversion 1832 unit receive a sequence of outputs corresponding to the different detectors. The output of each detector represents a line integral of attenuation measurable along a respective one of the beam paths. The fan-shaped acoustic beam subtends an angle sufficient to include the entire region of interest in the plane of the body. Accordingly a complete scan of the plane can be made merely by orbiting the frame supporting the source and detectors around the body to accumulate the set of convolved projection signals at different angular positions. The band of detectors moves in synchronism with the beam in order to generate the set of convolved projection signals. After each complete scan of the plane, a fixture 1831 supporting the frame advances so as to move the frame away from the body, thereby allowing successive planar sections of the body to be scanned.

The set of convolved projection signals are digitized by the analog to digital converter and are received by a projection data processor 1854 and storage device 1855. The projection data processor employs methods well known to those with ordinary skill in the art of computed tomography to transform the digitized set of convolved projection signals into acoustic attenuation data vectors. The acoustic attenuation data vectors corresponds to acoustic attenuation at spaced grid apart locations within the section of body being examined. Examples of such methods include an appropriate convolution-type implementation of the Radon inversion formula as discussed previously. As the fixture 1831 advances, the acoustic attenuation data vectors corresponding to each successive plane are stored in a storage memory 1855, thereby completing a set of three dimensional acoustic attenuation data vectors corresponding to a three dimensional acoustic attenuation signal pattern. Each data vector has an acoustic attenuation component and a location component corresponding to a respective three dimensional grid location within the body.

In accordance with the principles of the present invention discussed previously, a threshold generator 1861 generates an acoustic attenuation threshold value. For example, an operator generates the threshold value by typing the threshold value at a keyboard. The threshold value and the set of three dimensional acoustic attenuation signal pattern define a three dimensional isosurface that would partition the three dimensional acoustic attenuation signal pattern into pattern groupings.

The sorter 1862 receives the threshold value from the threshold generator and data vectors from the storage memory. The sorter sorts data vectors into a first and second group; the first group including data vectors each having an acoustic attenuation component less than the threshold value, the second group including data vectors each having an acoustic attenuation component greater than the threshold value.

As shown in FIG. 18, a saddle value generator 1863 generates face saddle values and body saddle values from the sorted data vectors in accordance with principles of the present invention discussed previously. The saddle value comparator 1865 compares saddle values to the threshold value received from the threshold generator. The interpolator 1866 receives sorted data vectors from the sorter 1862 and generates polygon vertex points, which approximately lie on the isosurface at locations between pairs of adjacent data vectors. A polygon generator 1864 analyzes the sorted data vectors and the output of the saddle value comparator, applying Propositions 1–3 thereto as discussed previously herein. From such application of Propositions 1–3, the polygon generator determines how the isosurface would partition the three dimensional acoustic attenuation signal pattern. The polygon generator receives the polygon vertex points from the interpolator and links the polygon vertex points to generate a network of polygons that is topologically consistent with the isosurface. A display processor 1867 is in cooperative communication with the polygon generator. Based upon the network of polygons generated, the display processor 1867 controls a display device 1868 to generate a topologically consistent visual display depicting the isosurface. In a preferred embodiment of the present invention the projection data processor 1854, the sorter 1862, the saddle value generator 1863, the saddle value comparator 1865, the interpolator 1866, the polygon generator 1864 and the display processor 1867 arc all essentially embodied in microprocessors executing suitable instructions.

Figure 19:
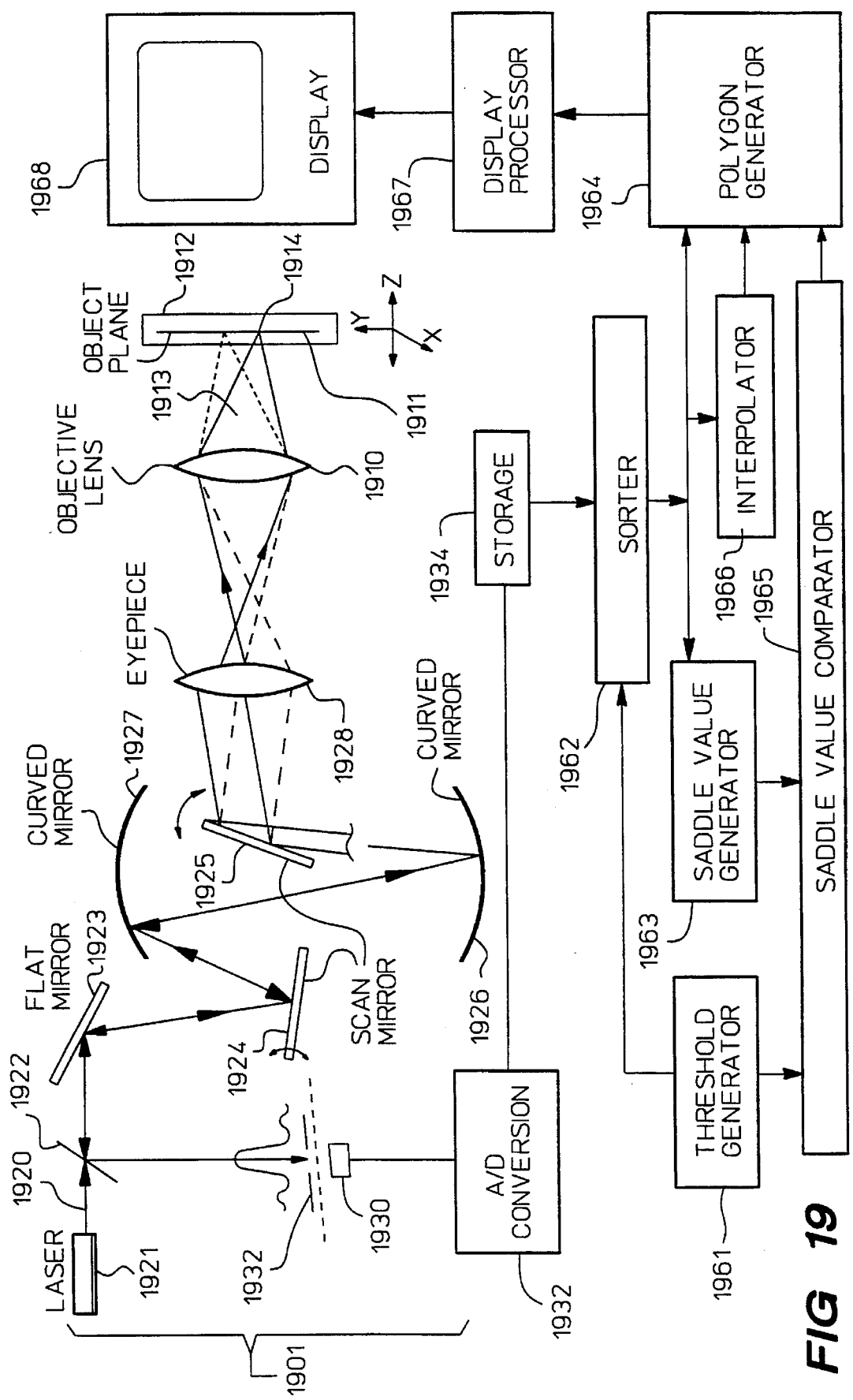
FIG. 19 shows a block diagram of a laser scanning microscope used in conjunction with the present invention.

There is illustrated in FIG. 19 in diagrammatic form a laser scanning microscope 1901 used in conjunction with an alternative embodiment of the present invention to generate yet another three dimensional signal pattern. The laser scanning microscope includes an objective lens 1910 for focusing incident light 1920 from a source such as a laser 1921 onto an object plane 1911. As illustrated in FIG. 19, the object plane may lie on, or in, a specimen or target material 1912. The illumination provided by incident light beam fills a converging cone generally indicated at 1913, the cone passing into the specimen to reach the plane of focus at the object plane. The incident light forms a waist, or focal point 1914, on the object plane. The diameter of the focal point can be selected to produce desired resolution. For enhanced resolution, it is preferable that the diameter of the focal point is made as small as possible, for example less than 1 micron. As is well known to those with ordinary skill in the art, by adjustment of the microscope optics, the location of the focal point in the specimen can be selected along an optical axis of the cone corresponding to a Z axis shown in FIG. 19. Additionally, the incident beam may be scanned in an X - Y plane perpendicular to the Z axis by means of scanning mirrors in the optical path of the microscope.

The optical path from laser to the object plane includes a beam splitter 1922 onto which light from the laser is directed. Light from the laser passes through the beam splitter to reach a fiat mirror 1923 which directs the light to a pair of scanning mirrors 1924 and 1925 by way of curved mirrors 1926 and 1927. The scanning mirrors 1924 and 1925 are rotatable about mutually perpendicular axis in order to move incident light along perpendicular X and Y axis on the object plane so that the stationary specimen is scanned by the incident beam. The light from the scanning mirrors passes through eyepiece 1928 and is focused through the objective lens 1910 to the object plane.

The light incident on the specimen initiates a response signal from the specimen. The response signal travels back through the microscope, retracing the optical path of the incident beam back to the beam splitter 1922. In a preferred embodiment, the response signal is reflectance of the incident light by the specimen. In an alternative embodiment, the response signal is a fluorescence signal excited by incident light on a fluorophore material contained in the specimen. From the specimen, the response signal thus passes through objective lens 1910 and eyepiece 1928, the scanning mirrors 1925 and 1924, and the curved mirrors 1926 and 1927, and is reflected by fiat mirror 1923 back to the beam splitter. The response signal is substantially reflected by the beam splitter 1922 to a suitable detector 1930, for example a photomultiplier tube. An adjustable confocal pin hole 1932 is provided in the collection optics to minimize reflected light from above and below the plane of focus. A depth discrimination or optical sectioning property of the confocal pin hole is well known to those with ordinary skill in the art. When a portion of the specimen is located in the object plane and the reflected light is focused on the pinhole, then a large detected signal is produced. On the other hand, when the portion of the specimen is out of the object plane, a defocussed spot is formed at the measured intensity is greatly reduced. A key property which optical sectioning provides is the ability to probe the specimen by scanning the specimen in the X - Y plane at a fixed depth respective to the Z axis. Upon completing each scan, a subsequent measurement sequence is initiated by adjusting lenses that determine the focal point and by scanning the specimen in a new X - Y plane corresponding to a new fixed depth. Signals produced by the detector are digitized by an analog to digital converter 1932 and stored in a storage device 1934 during a sequence of scans.

The digitized signals are stored as a set of three dimensional response data vectors corresponding to a three dimensional response signal pattern measurable at spaced apart grid locations within the specimen. Each data vector has a respective response component and a respective location component. In the preferred embodiment, the response signal pattern is a three dimensional reflectance signal pattern. In the alternative embodiment, the response signal pattern is a three dimensional fluorescence signal pattern.

In accordance with the principles of the present invention discussed previously, a threshold generator 1961 generates a response threshold value. For example, an operator generates the threshold value by typing the threshold value at a keyboard. The threshold value and the three dimensional response signal pattern define a three dimensional isosurface that would partition the signal pattern into pattern groupings.

The sorter 1962 receives the threshold value from the threshold generator and data vectors from the storage memory. The sorter sorts data vectors into a first and second group; the first group including data vectors each having a response component less than the threshold value, the second group including data vectors each having a response component greater than the threshold value.

As shown in FIG. 19, a saddle value generator 1963 generates face saddle values and body saddle values from the sorted data vectors in accordance with principles of the present invention discussed previously herein. The saddle value comparator 1965 compares saddle values to the threshold value received from the threshold generator. The interpolator 1966 receives sorted data vectors from the sorter 1962 and generates polygon vertex points, which approximately lie on the isosurface at locations between pairs of adjacent data vectors. A polygon generator 1964 analyzes the sorted data vectors and the output of the saddle value comparator, applying Propositions 1–3 thereto as discussed previously herein. From such application of Propositions 1–3, the polygon generator determines how the isosurface would partition the three dimensional response signal pattern. The polygon generator receives the polygon vertex points from the interpolator and links the polygon vertex points to generate a network of polygons that is topologically consistent with the isosurface. A display processor 1967 is in cooperative communication with the polygon generator. Based upon the network of polygons generated, the display processor 1967 controls a display device 1968 to generate a topologically consistent visual display depicting the isosurface. In a preferred embodiment of the present invention the projection data processor 1954, the sorter 1962, the saddle value generator 1963, the saddle value comparator 1965, the interpolator 1966, the polygon generator 1964 and the display processor 1967 are all essentially embodied in microprocessors executing suitable instructions.

Figure 20:
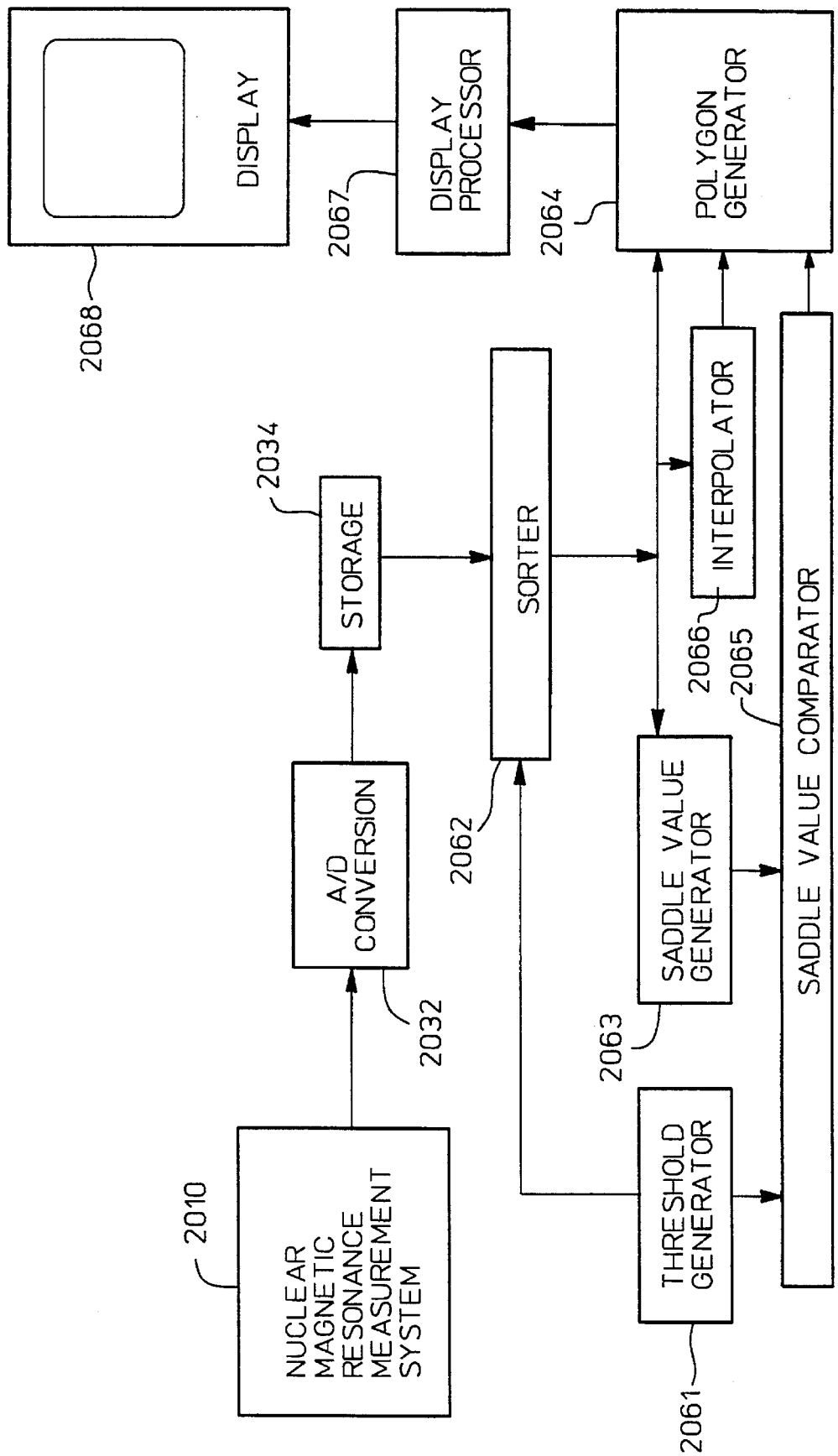
FIG. 20 shows a block diagram of a nuclear magnetic resonance measurement system used in conjunction with the present invention.

FIG. 20 shows a simplified block diagram of an alternative embodiment of the present invention wherein a nuclear magnetic resonance measurement system 2010 generates a three dimensional resonance signal pattern corresponding to resonances measurable at spaced apart grid locations within a body under examination by the system. The principles of nuclear magnetic resonance are well known to those with skill in the art and accordingly are not discussed further here. Resonance signals produced by the measurement system are digitized by an analog to digital converter 2032 and stored in a storage device 2034. The digitized signals are stored as a set of three dimensional resonance data vectors corresponding to the three dimensional resonance signal pattern. Each data vector has a respective resonance component and a respective location component.

In accordance with the principles of the present invention discussed previously, a threshold generator 2061 generates a resonance threshold value. For example, an operator generates the threshold value by typing the threshold value at a keyboard. The threshold value and the three dimensional resonance signal pattern define a three dimensional isosurface that would partition the signal pattern into pattern groupings.

The sorter 2062 receives the threshold value from the threshold generator and data vectors from the storage memory. The sorter sorts data vectors into a first and second group; the first group including data vectors each having a resonance component less than the threshold value, the second group including data vectors each having a resonance component greater than the threshold value.

As shown in FIG. 20, a saddle value generator 2063 generates face saddle values and body saddle values from the sorted data vectors in accordance with principles of the present invention discussed previously. The saddle value comparator 2065 compares saddle values to the threshold value received from the threshold generator. The interpolator 2066 receives sorted data vectors from the sorter 2062 and generates polygon vertex points, which approximately lie on the isosurface at locations between pairs of adjacent data vectors. A polygon generator 2064 analyzes the sorted data vectors and the output of the saddle value comparator, applying Propositions 1–3 thereto as discussed previously herein. From such application of Propositions 1–3, the polygon generator determines how the isosurface would partition the three dimensional resonance signal pattern. The polygon generator receives the polygon vertex points from the interpolator and links the polygon vertex points to generate a network of polygons that is topologically consistent with the isosurface. A display processor 2067 is in cooperative communication with the polygon generator. Based upon the network of polygons generated, the display processor 2067 controls a display device 2068 to generate a topologically consistent visual display depicting the isosurface. In a preferred embodiment of the present invention the projection data processor 2054, the sorter 2062, the saddle value generator 2063, the saddle value comparator 2065, the interpolator 2066, the polygon generator 2064 and the display processor 2067 are all essentially embodied in microprocessors executing suitable instructions.

Figure 21:
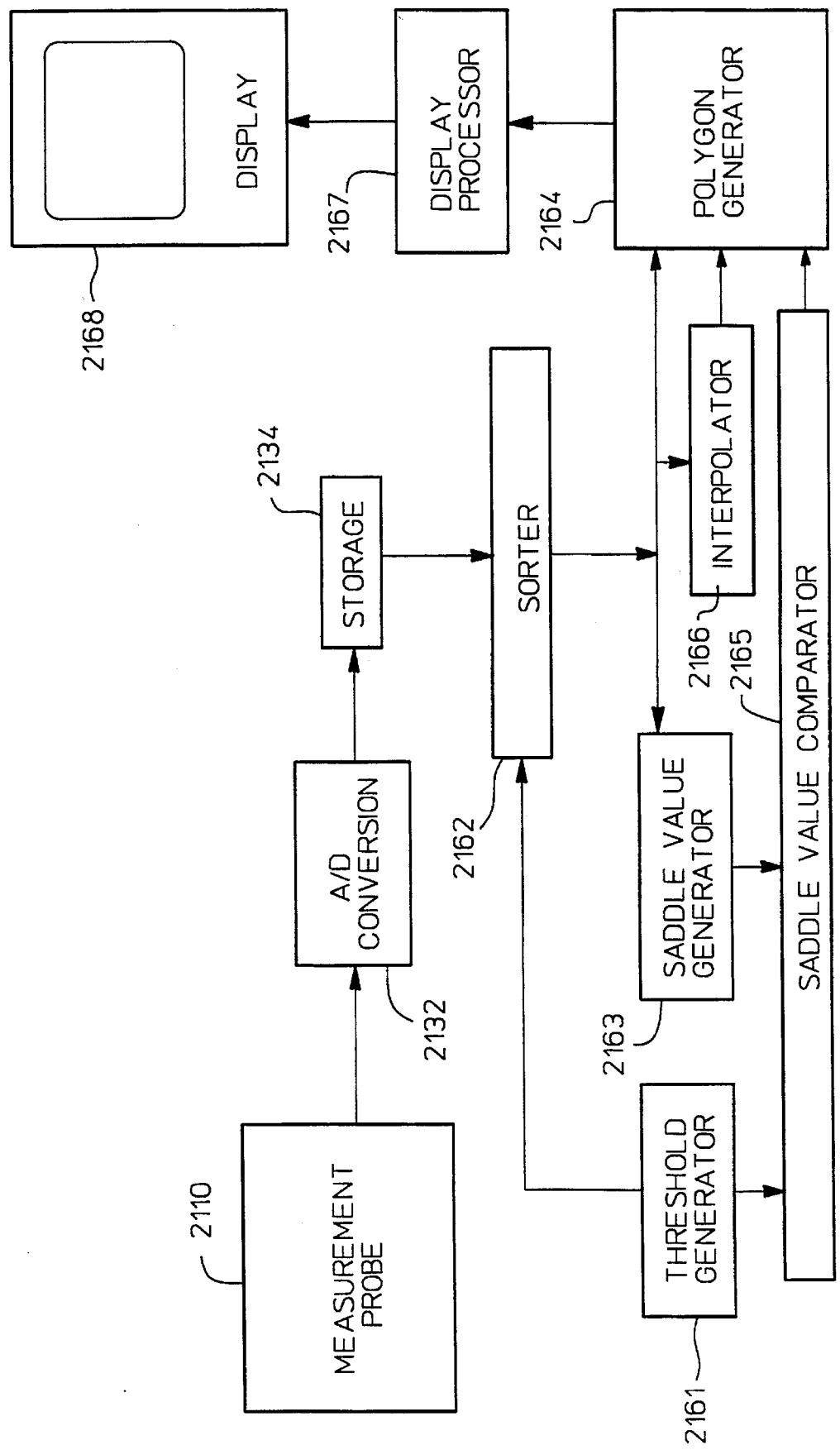
FIG. 21 shows a block diagram of a measurement probe used in conjunction with the present invention.

FIG. 21 shows a simplified block diagram an alternative embodiment of the present invention wherein a measurement probe 2110 generates a three dimensional measured signal pattern corresponding to temperatures measurable at spaced apart grid locations within a body under examination by the system. For example, temperatures at spaced apart locations within the body may be measured while a thermocouple temperature probe is moved past the locations. Alternatively, the measured signal pattern could correspond to flow velocity measurable at spaced apart grid locations within a fluid flow under examination. For example, flow velocity at spaced apart locations within the fluid flow may be measured while a flow velocity sensor is moved past the locations. Signals produced by the measurement probe are digitized by an analog to digital converter 2132 and stored in a storage device 2134. The digitized signals are stored as a set of three dimensional measurement data vectors corresponding to the three dimensional measured signal pattern. Each data vector has a respective measurement component and a respective location component. Alternatively, the measured signal pattern corresponding to the data vectors can be generated by well known computer techniques for simulation of temperatures within a body, velocity in a fluid flow, or some other characteristic that spatially varies with a bounded three dimensional space.

In accordance with the principles of the present invention discussed previously, a threshold generator 2161 generates a threshold value corresponding to respective a temperature or a respective velocity rate of the alternative embodiments. For example, an operator generates the threshold value by typing the threshold value at a keyboard. The threshold value and the three dimensional measured signal pattern define a three dimensional isosurface that would partition the signal pattern into pattern groupings.

The sorter 2162 receives the threshold value from the threshold generator and data vectors from the storage memory. The sorter sorts data vectors into a first and second group; the first group including data vectors having a measurement component less than the threshold value, the second group including data vectors each having a measurement component greater than the threshold value. A saddle value generator 2163 generates face saddle values and body saddle values from the sorted data vectors in accordance with the principles of the present invention discussed previously.

As shown in FIG. 21, a saddle value generator 2163 generates face saddle values and body saddle values from the sorted data vectors in accordance with principles of the present invention discussed previously. The saddle value comparator 2165 compares saddle values to the threshold value received from the threshold generator. The interpolator 2166 receives sorted data vectors from the sorter 2162 and generates polygon vertex points, which approximately lie on the isosurface at locations between pairs of adjacent data vectors. A polygon generator 2164 analyzes the sorted data vectors and the output of the saddle value comparator, applying Propositions 1–3 thereto as discussed previously herein. From such application of Propositions 1–3, the polygon generator determines how the isosurface would partition the three dimensional measured signal pattern. The polygon generator receives the polygon vertex points from the interpolator and links the polygon vertex points to generate a network of polygons that is topologically consistent with the isosurface. A display processor 2167 is in cooperative communication with the polygon generator. Based upon the network of polygons generated, the display processor 2167 controls a display device 2168 to generate a topologically consistent visual display depicting the isosurface. In a preferred embodiment of the present invention the projection data processor 2154, the sorter 2162, the saddle value generator 2163, the saddle value comparator 2165, the interpolator 2166, the polygon generator 2164 and the display processor 2167 are all essentially embodied in microprocessors executing suitable instructions.

In the various embodiments discussed herein, the present invention provides topologically consistent visual displays of an internal characteristic of a physical object with great computational efficiency. While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

Appendix A

This appendix is a discussion directed to a method for generating coordinates of polygon vertex points approximately lying on an isosurface between respective pairs of adjacent data vectors and to a method for generating saddle values of a trilinear interpolant within a cube. A bounded space having only three orthogonal dimensions will be discussed, though mathematical extensions to higher dimensional space and lower dimensional space are straightforward to those with ordinary skill in the art. A physical characteristic of interest that spatially varies within a body can be analogized to a function $\phi(x,y,z)$ in the domain of real numbers. Then let N be a natural number and let $\Delta$ equal $1/(N-1)$. N is called the sampling number and $\Delta$ the sampling interval. A corresponding discrete uniform measurement sampling of $\phi$ yields data that may be expressed as a set of data vectors, wherein each data vector has four components $(i, j, k, F(i,j,k))$ such that for i, j, and k in the range $0,1,2,\ldots,N-1$, and such that $F(i,j,k) = \phi(i\Delta, j\Delta, k\Delta)$. The set of data vectors is called a sample F and the number of such data vectors in the set is $N^3$. The set of $N^3$ data vectors spatially correspond to a set of $N^3$ spaced apart grid locations. In this way, the sample F divides the bounded space into a matrix of $(N-1)^3$ cubic cells, with the set of grid locations being vertices for the matrix of cubic cells. Any particular cubic cell corresponds to a respective grouping of eight cube vertices, that in turn correspond to a respective grouping of eight spatially coadjacent data vectors. Any particular cell has a respective six faces. Each of the respective six faces correspond to a respective grouping of four cube vertices, that in turn correspond to a respective grouping of four coplanar data vectors.

The trilinear interpolant T interpolating the values of the function $\phi$ at the vertices of a cube of side $\Delta$ may be expressed as follows:

$T(x,y,z)=\phi(0,0,0)+ (\phi(\Delta 0,0)-\phi(0,0,0))x/\Delta+(\phi(0,\Delta,0)-\phi(0,0,0))y/\Delta+ (\phi(0,\Delta,\Delta)-\phi(0,0,0))z/\Delta+ (\phi(\Delta,\Delta, 0)-\phi(0,\Delta,0)-\phi\Delta, 0,0)+\phi(0,0,0))xy/\Delta^2+ (\phi(0,\Delta,\Delta)-\phi(0,0,\Delta)-\phi(0,\Delta,0)+\phi(0,0,0))yz/\Delta^2+ (\phi(\Delta,0,\Delta)-\phi(0,0,\Delta)-\phi(\Delta,0,0)+\phi(0,0,0))xz/\Delta^2+ (\phi(\Delta,\Delta,\Delta)-\phi(0,\Delta,\Delta)-\phi(\Delta, 0,\Delta)+\phi(0,0,\Delta)-\phi(\Delta,\Delta,0)+ \phi(0,\Delta,0)+\phi(\Delta,0,0)-\phi(0,0,0))xyz/\Delta^3$ Given the data vector set F having $N^3$ data vectors, it is possible to derive a piecewise trilinear function f consisting of $(N-1)^3$ trilinear patches T interpolating the given sample.

For a given threshold t, the interpolant isosurface can be expressed as an interpolant isosurface I uniquely defined by the equation $f(x,y,z)=t$. Specifically, the interpolant isosurface I is simply the collection of the surfaces obtained by setting $T(x,y,z)=t$, for each of the $(N-1)^3$ trilinear patches T that compose f.

For convenience, the previous long expression for the trilinear interpolant T is rewritten in the form:

$T(x,y,z)=axyz+bxy+cyz+dzx+ex+fy+gz+h.$

The polygon vertex points are interpolant limited to edges of the cubic cell. For example, for an edge of the cubic cell along $x=0$ and $y=0$:

$T(0,0,z)=gz+h=t$

Solving yields $z=(t-h)/g$ and the location of the polygon vertex point for the cube edge along $x=0$ and $y=0$ has been determined. Coordinates for polygon vertex points intersecting the remaining 11 cube edges may be generated in a similar manner. Instead of the linear interpolation method discussed above, nonlinear interpolation methods can be used with beneficial results.

The face saddle points of T are saddle points of T limited to each face of the cube. For instance, for the face $x=0$, T reduces to the bilinear interpolant on that face, and can be written:

$T(0,y,z)=cyz+fy+gz+h.$

Setting:

$\partial T/\partial y=\partial T/\partial z=0,$ and solving, the saddle point at $(0, -t/c, -g/c)$ is found to have a saddle-value of $h-fg/c$. Similar calculations produce the face saddle values on the other five faces. The body saddle point is the solution to the system of equations:

$\partial T/\partial x=ayz+by+dz+ e=0$ $\partial T/\partial y=axz+bx+cz+f=0$ $\partial T/\partial z=axy+cy+dx+g=0$ If a is equal to 0, the solution is given by:

$x=(ec-df-bg)/2bd$ $y=(-ec+df-bg)/2bc$ $z=(-ec-df+bg)/2cd$

The body saddle value can then be obtained by substituting the above values for x, y, and z in the equation for $T(x,y,z)$.

If a is not equal to 0, then:

$x=(1/a)(-c\pm((bc-af)(ag-cd)/(ae-bd))^{1/2})$ $z=-(bx+f)/(ax+c)$ $y=-(dx+g)/(ax+c)$

The body saddle value can then be obtained by substituting the above values for x, y, and z in the equation for $T(x,y,z)$.

What is claimed is:

1. A method for producing a visual representation of a three dimensional body, the method comprising:

providing a computer having a memory;

generating a three dimensional signal pattern that represents the values of a physical property associated with a three dimensional body at spaced apart locations within the body;

generating a threshold value of the physical property, the threshold value and the three dimensional signal pattern defining a three dimensional isosurface that partitions the three dimensional signal pattern into pattern groupings;

converting the three dimensional signal pattern into a set of data vectors, each data vector having a physical property component and a location component corresponding to a respective one of the spaced apart locations;

storing the data vectors in the memory of the computer using the computer to sort the data vectors, so as to create a first and second group of data vectors, the first group including data vectors having a physical property component less than the threshold value, the second group including data vectors having a physical property component greater than the threshold value;

using the computer to generate coordinates of a set of polygon vertex points approximately lying on the three dimensional isosurface, coordinates of each member of the set of polygon vertex points being interpolated using a respective data vector belonging to the first group and a respective data vector belonging to the second group;

using the computer to generate a body saddle value from data vectors having location components that are spatially coadjacent with one another;

using the computer to compare the threshold value to the body saddle value;

linking two members of the set of polygon vertex points if the body saddle value and values associated with the two members are all greater than the threshold value;

linking two members of the set of polygon vertex points if the body saddle value and values associated with the two members are all less than the threshold value;

using the linked members of the set of polygon vertex points to generate a piecewise polygonal approximation that is topologically consistent with the isosurface, in that the polygonal approximation partitions the signal pattern into the same pattern groupings as does the isosurface; and using the polygonal approximation to generate an image representative of the body.

2. A method as in claim 1 wherein:

the three dimensional signal pattern comprises an X-ray attenuation signal pattern; and the step of generating the three dimensional signal pattern includes:

stimulating the three dimensional body with a computed tomography scanner so as to produce an X-ray attenuation signal; and detecting the X-ray attenuation signal so as to generate the X-ray attenuation signal pattern.

3. A method as in claim 1 wherein:

the three dimensional signal pattern comprises an acoustic attenuation signal pattern; and the step of generating the three dimensional signal pattern includes:

stimulating the three dimensional body with a computed tomography scanner so as to produce an acoustic attenuation signal; and detecting the acoustic attenuation signal so as to generate the acoustic attenuation signal pattern.

4. A method as in claim 1 wherein:

the three dimensional signal pattern is a nuclear magnetic resonance signal pattern; and the step of generating the three dimensional signal pattern includes:

stimulating the three dimensional body so as to produce a nuclear magnetic resonance signal; and detecting the nuclear magnetic resonance signal so as to generate the nuclear magnetic resonance signal pattern.

5. A method as in claim 1 wherein:

the step of generating the three dimensional signal pattern includes:

stimulating the three dimensional body with a scanning beam of radiant energy so as generate a response signal; and detecting the response signal so as to generate the three dimensional signal pattern.

6. A method as in claim 5 wherein the scanning beam of radiant energy is a scanning laser beam.

7. A method as in claim 5 wherein the response signal is generated by the body reflecting a portion of the beam of radiant energy.

8. A method as in claim 5 wherein the scanning beam excites a portion of the body to an elevated energy state thereby causing the portion of the body to emit the response signal.

9. A method as in claim 5 wherein the response signal is a fluorescence signal.

10. A method as in claim 1 wherein:

the three dimensional signal pattern is a flow velocity signal pattern; and the step of generating the three dimensional signal pattern includes detecting velocity within a fluid flow so as to generate the flow velocity signal pattern.

11. A method as in claim 1 wherein:

the three dimensional signal pattern is a temperature signal pattern; and the step of generating the three dimensional signal pattern includes detecting temperature within the three dimensional body so as to generate the temperature signal pattern.

12. The method of claim 1 wherein the step of sorting the data vectors further comprises sorting the data vectors into octrees.

13. An apparatus for producing a visual representation of a three dimensional isosurface, comprising:

a computer having a memory measurement means for generating a three dimensional signal pattern that represents the values of a physical property associated with a three dimensional body at spaced apart locations within said body;

input means for generating a threshold value of the physical property, the threshold value and the three dimensional signal pattern defining a three dimensional isosurface that partitions the three dimensional signal pattern into pattern groupings;

means for converting the three dimensional signal pattern into a set of data vectors, each data vector having a physical property component and a location component corresponding to a respective one of the spaced apart locations;

means for storing the data vectors in the memory of the computer means for sorting the data vectors, so as to create a first and second group of data vectors, the first group including data vectors having a physical property component less than the threshold value, the second group including data vectors having a physical property component greater than the threshold value;

means for generating coordinates of a set of polygon vertex points approximately lying on the three dimensional isosurface, coordinates of each member of the set of polygon vertex points being interpolated using a respective data vector belonging to the first group and a respective data vector belonging to the second group;

means for generating a body saddle value from data vectors having location components that are spatially coadjacent with one another;

means for comparing the threshold value to the body saddle value;

means for linking two members of the set of polygon vertex points if the body saddle value and values associated with the two members are all greater than the threshold value;

means for linking two members of the set of polygon vertex points if the body saddle value and values associated with the two members are all less than the threshold value means for linking members of the set of polygon vertex points to generate a piecewise polygonal approximation that is topologically consistent with the isosurface, in that the polygonal approximation partitions the signal pattern into the same pattern groupings as does the isosurface; and display means coupled with the computer for using the polygonal approximation to generate an image representative of the body.

\* \* \* \* \*